(12) United States Patent
Beach et al.

(10) Patent No.: US 11,807,541 B2
(45) Date of Patent: Nov. 7, 2023

(54) ELECTRICALLY ENHANCED HABER-BOSCH (EEHB) ANHYDROUS AMMONIA SYNTHESIS

(71) Applicants: Starfire Energy, Aurora, CO (US); Colorado School of Mines, Golden, CO (US)

(72) Inventors: Joseph Beach, Aurora, CO (US); Jon Kintner, Aurora, CO (US); Adam Welch, Golden, CO (US); Jason Ganley, Golden, CO (US); Ryan O'Hayre, Golden, CO (US)

(73) Assignees: Starfire Energy, Aurora, CO (US); Colorado School of Mines, Golden, CO (US)

( * ) Notice: Subject to any disclaimer, the term of this patent is extended or adjusted under 35 U.S.C. 154(b) by 0 days.

(21) Appl. No.: 16/824,661

(22) Filed: Mar. 19, 2020

(65) Prior Publication Data

US 2020/0231455 A1  Jul. 23, 2020

Related U.S. Application Data

(62) Division of application No. 15/446,929, filed on Mar. 1, 2017, now abandoned.
(Continued)

(51) Int. Cl.
*C01C 1/04*  (2006.01)
*B01J 37/02*  (2006.01)
(Continued)

(52) U.S. Cl.
CPC .......... *C01C 1/0411* (2013.01); *B01J 23/462* (2013.01); *B01J 35/0033* (2013.01);
(Continued)

(58) Field of Classification Search
CPC ... C01C 1/0411; C01C 1/0417; C01C 1/0405; C01C 1/0494; B01J 23/462;
(Continued)

(56) References Cited

U.S. PATENT DOCUMENTS 2,898,183 A * 8/1959 Fauser ................. C01C 1/0405
                                                            423/360
3,344,052 A    9/1967 Yeh
(Continued)

FOREIGN PATENT DOCUMENTS

CN       2318593 Y     5/1999
CN     103237599 A     8/2013
(Continued)

OTHER PUBLICATIONS

US 8,585,996 B2, 11/2013, Nakamura et al. (withdrawn)
(Continued)

*Primary Examiner* — Xiuyu Tai
(74) *Attorney, Agent, or Firm* — Holzer Patel Drennan

(57) ABSTRACT

The present invention is directed to a method and system for enhancing the production of ammonia from gaseous hydrogen and nitrogen. Advantageously, the method and system does not emit carbon gases during production. The method and system enhances the production of ammonia compared to traditional Haber-Bosch reactions.

20 Claims, 13 Drawing Sheets
(6 of 13 Drawing Sheet(s) Filed in Color)

Related U.S. Application Data

(60) Provisional application No. 62/421,482, filed on Nov. 14, 2016, provisional application No. 62/301,991, filed on Mar. 1, 2016.

(51) Int. Cl.
   *B01J 37/08* (2006.01)
   *B01J 37/18* (2006.01)
   *B01J 35/00* (2006.01)
   *B01J 23/46* (2006.01)

(52) U.S. Cl.
   CPC ......... *B01J 37/0203* (2013.01); *B01J 37/086* (2013.01); *B01J 37/18* (2013.01); *C01C 1/0417* (2013.01); *Y02P 20/52* (2015.11)

(58) Field of Classification Search
   CPC .. B01J 35/0033; B01J 37/0203; B01J 37/086; B01J 37/18; B01J 23/002; B01J 37/0205; B01J 23/63; B01J 21/066; B01J 2523/00; B01J 37/0236; B01J 2523/15; B01J 2523/3712; B01J 2523/48; B01J 2523/821; B01J 2523/3706; B01J 2523/25; B01J 2523/36; B01J 2523/24; B01J 19/088; B01J 8/0214; B01J 23/58; B01J 37/0201; B01J 2219/0849; B01J 2219/083; B01J 2219/0847; B01J 2219/0841; B01J 2219/0883; B01J 2219/0809; B01J 2219/0892; B01J 2219/0843; Y02P 20/52; Y02P 20/133; C25B 1/00

See application file for complete search history.

(56) References Cited

U.S. PATENT DOCUMENTS

| | | | |
|---|---|---|---|
| 3,395,982 A * | 8/1968 | Didycz ............. | B01J 8/0453 423/360 |
| 3,519,546 A | 7/1970 | Lee | |
| 3,721,532 A | 3/1973 | Wright et al. | |
| 3,932,139 A | 1/1976 | Vilceanu et al. | |
| 4,215,099 A | 7/1980 | Pinto et al. | |
| 4,312,640 A | 1/1982 | Verrando | |
| 4,322,394 A | 3/1982 | Mezey et al. | |
| 4,537,760 A | 8/1985 | Lavie | |
| 4,567,315 A | 1/1986 | Owaysi et al. | |
| 5,268,091 A | 12/1993 | Boitiaux et al. | |
| 5,282,886 A | 2/1994 | Kobayashi et al. | |
| 5,326,537 A | 7/1994 | Cleary | |
| 5,584,175 A | 12/1996 | Carlborg et al. | |
| 5,711,926 A | 1/1998 | Knaebel | |
| 6,471,932 B1 | 10/2002 | Gieshoff et al. | |
| 6,609,570 B2 | 8/2003 | Wellington et al. | |
| 6,712,950 B2 | 3/2004 | Denvir et al. | |
| 6,739,394 B2 | 5/2004 | Vinegar et al. | |
| 6,746,650 B1 | 6/2004 | Lesieur | |
| 6,881,308 B2 | 4/2005 | Denvir et al. | |
| 7,314,544 B2 | 1/2008 | Murphy et al. | |
| 8,038,957 B1 | 10/2011 | Cleary | |
| 8,623,313 B2 | 1/2014 | Nakamura et al. | |
| 8,789,586 B2 | 7/2014 | de Rouffignac et al. | |
| 9,108,175 B2 | 8/2015 | Schwefer et al. | |
| 9,108,858 B2 | 8/2015 | McDonald et al. | |
| 9,217,068 B2 | 12/2015 | D'Souza et al. | |
| 9,359,867 B2 | 6/2016 | Pennewitz et al. | |
| 11,286,169 B2 | 3/2022 | Beach et al. | |
| 2001/0018039 A1 | 8/2001 | Gam | |
| 2002/0028171 A1 | 3/2002 | Goetsch et al. | |
| 2003/0211026 A1 | 11/2003 | Moore | |
| 2004/0039514 A1 | 2/2004 | Steichen et al. | |
| 2005/0247050 A1 | 11/2005 | Kaboord et al. | |
| 2006/0039847 A1 | 2/2006 | Kaboord et al. | |
| 2006/0204651 A1 | 9/2006 | Wai et al. | |
| 2008/0193360 A1 | 8/2008 | Holbrook et al. | |
| 2012/0308467 A1 | 12/2012 | Carpenter et al. | |
| 2013/0183224 A1 | 7/2013 | Hosono et al. | |
| 2013/0224476 A1 | 8/2013 | Zheng et al. | |
| 2014/0140911 A1 | 5/2014 | Bergeal et al. | |
| 2015/0184281 A1 | 7/2015 | Ito et al. | |
| 2015/0217278 A1 | 8/2015 | Hosono et al. | |
| 2015/0239747 A1 | 8/2015 | Hosono et al. | |
| 2015/0353369 A1 | 12/2015 | Sekine et al. | |
| 2016/0271595 A1 | 9/2016 | Chen et al. | |
| 2017/0087537 A1 | 3/2017 | Kageyama et al. | |
| 2017/0088433 A1 | 3/2017 | Kageyama et al. | |
| 2017/0253492 A1 | 9/2017 | Beach et al. | |
| 2020/0248606 A1 | 8/2020 | Joo et al. | |

FOREIGN PATENT DOCUMENTS

| | | |
|---|---|---|
| CN | 104445967 A | 3/2015 |
| EP | 1095906 A2 | 5/2001 |
| EP | 3415805 A1 | 12/2018 |
| JP | 2008013396 A | 1/2008 |
| WO | 1998040311 A1 | 9/1998 |
| WO | 2002016031 A1 | 2/2002 |
| WO | 0247804 A1 | 6/2002 |
| WO | 2002047804 A1 | 6/2002 |
| WO | 2006099716 A1 | 9/2006 |
| WO | 2007104569 A1 | 9/2007 |
| WO | 2010114386 A1 | 10/2010 |
| WO | 2015177773 A1 | 11/2015 |
| WO | 2018213305 A1 | 11/2018 |
| WO | 2019104204 A1 | 5/2019 |
| WO | 2021168226 A1 | 8/2021 |

OTHER PUBLICATIONS

"Comparative Quantitative Risk Analysis of Motor Gasoline, LPG, and Anhydrous Ammonia as an Automotive Fuel," Quest Consultants Inc., 2009, Iowa State University, 59 pages.

"KAAP Ammonia Synthesis Converter," KBR, 2011, retrieved from https://web.archive.org/web/20111015180221/http://www.kbr.com/Technologies/Proprietary-Equipment/KAAP-Ammonia-Synthesis-Converter/, 1 page.

"Targets for Onboard Hydrogen Storage Systems for Light-Duty Vehicles," U.S. Department of Energy Office of Energy Efficiency and Renewable Energy and The Freedom CAR and Fuel Partnership, Sep. 2009, 22 pages.

"Tracking Industrial Energy Efficiency and CO2 Emissions," International Energy Agency, 2007, pp. 82-85.

Denholm et al., "Grid Flexibility and storage required to achieve very high penetration of variable renewable electricity," Energy Policy, 2011, vol. 39(3), pp. 1817-1830, abstract only, 2 pages.

Frigo et al., "Further Evolution of an Ammonia Fuelled Range Extender for Hybrid Vehicles," NH3 Fuel Conference, Sep. 21-24, 2014, 23 pages.

Giamello, "Heterogeneous catalysis: Teaching an old material new tricks," Nature Chemistry, 2012, vol. 4(11), pp. 869-870, abstract only, 2 pages.

Haputhanthri, "Ammonia as an alternate transport fuel: Emulsifiers for gasoline ammonia fuel blends and real time engine performance," NH3 Fuel Conference, Sep. 22, 2014, 24 pages.

Inoue et al., "Highly Dispersed Ru on Electride [Ca24Al28O64]4+ (e−)4 as a Catalyst for Ammonia Synthesis," ACS Catalysis, 2014, vol. 4(2), pp. 676,679, abstract only, 1 page.

Kaiser, "10 Billion Plus: Why World Population Projections Were Too Low," Science Insider, 2011, retrieved from http://www.sciencemag.org/news/2011/05/10-billion-plus-why-world-population-projections-were-too-low, 5 pages.

Kitano et al., "Ammonia Synthesis using a stable electride as an electron donor and reversible hydrogen store," Nature Chemistry, 2012, vol. 4, pp. 934-940, abstract only, 2 pages.

Marnellos et al., "Synthesis of ammonia at atmospheric pressure with the use of solid state proton conductors," Journal of Catalysis, 2000, vol. 193(1), pp. 80-87, abstract only, 2 pages.

(56) References Cited

OTHER PUBLICATIONS

Matsuishi et al., "High-density electron anions in a nanoporous single crystal: [Ca24 Al28O64]4+(4e−)," Science 2003, vol. 301 (5633), pp. 626-629, abstract only, 3 pages.

Singh et al., "KRES-ESTM Revamp Makes More Ammonia from less Natural Gas by Energy Substitution," Session 4, Nitrogen & Syngas Conference, Feb. 21-24, 2011, abstract only, 1 page.

Yiokari et al., "High-pressure electrochemical promotion of ammonia synthesis over an industrial iron catalyst," Journal of Physical Chemistry A, 2000, vol. 104(46), pp. 10600-10602, abstract only, 1 page.

International Search Report and Written Opinion for PCT International Patent Application No. PCT/US17/20201, dated May 11, 2017, 10 pages.

International Search Report and Written Opinion for PCT International Patent Application No. PCT/US18/134637, dated Aug. 27, 2018, 9 pages.

International Preliminary Report on Patentability for PCT International Patent Application No. PCT/US17/20201, dated Sep. 13, 2018, 10 pages.

International Search Report and Written Opinion for PCT International Patent Application No. PCT/US18/32759, dated Aug. 1, 2018, 15 pages.

Search Report dated Apr. 28, 2023 in International Patent Application No. PCT/US2023/060785.

Search Report dated May 10, 2023 for International Patent Application No. PCT/US2023/063502.

Fertout, Radia Imane, et al., ""Nickel Supported on Alkaline Earth Metal—Doped γ-Al2O3—La2O3 as Catalysts for Dry Reforming of Methane"", Russian Journal of Applied Chemistry, 2020, vol. 93, No. 2, Abstract; Catalysts preparation, Feb. 2020, 289-298.

Jeong, Soyeon, et al., ""Sulfation and Desulfation Behavior of Pt—BaO/MgO—Al2O3 NOx Storage Reduction Catalyst"", Journal of nanoscience and nanotechnology, vol. 16, No. 5 (2016) 2.1 Catalyst Preparation, May 16, 2016, 4411-4416.

Li, Shuo, et al., ""Study on Catalytic Synthesis of Low Molecular Weight Polyether Polyol by Composite Alkaline arth Metal"", IOP Conf. Series: Earth and Environmental Science 453 (2020) 012083 vol 16, No. 5 (2016) 2.2. Preparation of Catalysts, 2020, 4411-4416.

Kim, Sung-Wng, et al., "Fabrication of room temperature-stable 12CaO · 7Al2O3 electride: a review", Journal of Materials Science: Materials in Electronics, vol. 18, 2007, 5-14.

\* cited by examiner

ELECTRICALLY ENHANCED HABER-BOSCH (EEHB) ANHYDROUS AMMONIA SYNTHESIS

CROSS REFERENCE TO RELATED APPLICATIONS

This application is a division of U.S. patent application Ser. No. 15/446,929 filed Mar. 1, 2017, which claims the priority and benefit under 35 U.S.C. § 119(e) to U.S. Provisional Application No. 62/301,991, filed on Mar. 1, 2016, and U.S. Provisional Application No. 62/421,482, filed on Nov. 14, 2016. Each of which is incorporated herein by reference in their entirety.

STATEMENT REGARDING FEDERALLY SPONSORED RESEARCH OR DEVELOPMENT

This invention was made with government support under grant number DE-AR0000685 awarded by the Department of Energy. The Government has certain rights in the invention.

FIELD OF THE INVENTION

This invention relates to increasing the rate of ammonia ($NH_3$) synthesis from nitrogen gas $N_2$ and hydrogen gas $H_2$ on a catalyst-decorated electride support.

BACKGROUND

An energy system that is free of fossil fuel carbon dioxide ($CO_2$) emissions is required to prevent the continued rise in atmospheric $CO_2$ while allowing for all of humanity to enjoy the same living standards those in the developed western world enjoy. While there are several well-developed $CO_2$-free energy generation options (e.g. wind, solar, hydro, nuclear), none presently have a well-developed $CO_2$-free fuel option. Ammonia can fill this need.

$NH_3$ can be burned directly as a fuel in reaction of Equation (1):

$$4NH_3(g) + 3O_2 \rightarrow 2N_2 + 6H_2O(g) + \text{heat} \quad (1)$$

It can also be used as a hydrogen storage medium if it is thermally reformed into hydrogen and nitrogen. In principle, $NH_3$ can be used as a $CO_2$-free fuel. However, nearly all current $NH_3$ production uses $CO_2$-producing feedstock and fuel.

Modern Haber-Bosch plants use approximately 31.4 GJ natural gas (feed and fuel) per ton of $NH_3$ produced. Haber-Bosch $NH_3$ synthesis for fertilizer currently uses between about 3-5% of global natural gas production and between about 1-2% of global energy production. In 2005, the average $CO_2$ emissions for Haber-Bosch $NH_3$ synthesis was 2.1 tonnes $CO_2$ per tonne $NH_3$, of which ⅔ was from steam reforming hydrocarbons to produce hydrogen and ⅓ was from fuel combustion to provide energy to the synthesis plants. At that time, approximately ¾ of Haber-Bosch $NH_3$ plants used natural gas, while the rest used coal or petroleum for feed and fuel.

Modern Haber-Bosch plant efficiency is maximized by running at a steady state. This requirement for efficiency makes it difficult to directly couple its operation to the energy produced by wind and solar power plants, which have a variable power output.

The Haber-Bosch process for producing $NH_3$ is exothermic reaction shown in Equation (2).

$$N_2(g) + 3H_2(g) \rightarrow 2NH_3(g)(\Delta H = -92.2 \text{kJ/mol}) \quad (2)$$

The reaction occurs in a reactor containing an iron oxide or ruthenium catalyst at 300-550° C. and 90-180 bar pressure. The elevated temperature is required to achieve a reasonable reaction rate. Due to the exothermic nature of $NH_3$ synthesis, the elevated temperature drives the equilibrium toward the reactants, but this is counteracted by the high pressure. In commercial production, waste heat from ammonia synthesis contributes to hydrogen production by steam reforming natural gas.

Electrides can be used as a catalyst support in a Haber-Bosch reaction. An electride is an ionic material in which trapped electrons play the role of negatively charged ions. C12A7:e– calcium aluminate electride is the first air-stable and temperature-stable electride that has been produced. C12A7:e– is a relatively new material, having been first produced in 2003. Its positively charged framework forms cages that contain electrons. Its chemical structure is $[Ca_{24}Al_{28}O_{64}]^{4+}(e-)_4$. The "C12A7" designation is cement chemistry nomenclature, in which C refers to CaO and A refers to $Al_2O_3$. The ":e–" designation signifies that the C12A7 has a portion of its oxygen anions replaced by electrons, defining it as being an electride. A proposed $NH_3$ synthesis pathway for electride-supported ruthenium (Ru) is illustrated in FIG. 1. FIG. 1 can be found in Kitano et al., "Ammonia Synthesis using a stable electride as an electron donor and reversible hydrogen store." Nature Chemistry 4 934-940 (2012). The reaction starts in the top image ($N_2$ and $H_2$ adsorbing onto a Ru island) and proceeds clockwise. The steps in the process are: (1) $H_2$ on the Ru islands dissociate into H; (2) H enter the electride and react with trapped $e^-$ to form $H^-$, making room for $N_2$ adsorption; (3) trapped $e^-$ transfer to $N_2$ antibonding orbitals via the Ru, putting the $N_2$ in an excited state (triple bond weakened); and (4) weakly bonded $N_2$ near the edge of the Ru islands react with $H^-$ in the electride, transferring $e^-$ back to the electride and transferring H to the excited-state $N_2$ to form $NH_3$ or its intermediates. Electride-supported Ru has an activity 10× larger than other Ru-loaded catalysts. The electride is critical to speeding the formation of weakly bonded $N_2$ by (a) removing H from the Ru surface so there is area available for $N_2$ to react, and (b) supplying $e^-$ to the Ru d-orbitals for transfer to the $N_2$, which weakens its triple bond. The use of C12A7:e– in traditional Haber-Bosch $NH_3$ synthesis is the subject of U.S. Publication No. 2013/0183224, which is incorporated in its entirety by reference.

It has been demonstrated that the activity of a catalyst can be modified by applying electricity to it. Two methods of electrically enhancing catalytic activity are (1) "Nonfaradaic Electrochemical Modification of Catalytic Activity" (NEMCA) and (2) the direct application of electric fields to the catalyst by placing it between the electrodes of a capacitor. In NEMCA, catalyst activity is increased by the application of an electric potential to the catalyst. That potential may or may not drive a current. If it does drive a current, the reaction rate is greater than is indicated by the passed current. It is attributed to the catalyst work function changing as ion position and energy are modulated by the applied potential. A state-of-the-art commercial promoted-Fe $NH_3$ catalyst exhibited up to a 13× increase in activity due to NEMCA (FIG. 2). FIG. 2 can be found in Yiokari et al., "High-pressure electrochemical promotion of ammonia synthesis over an industrial iron catalyst." i J. Phys. Chem. A 104 10000-10002 (2000). As described in Yiokari, the NH$_3$ catalyst was applied to one side of a proton-conducting ceramic and a silver paste was applied to the other side. The reactor was run at 440° C. or higher and 50 atm total pressure (720 psig). A −1 V potential was applied between the catalyst and the silver counter-electrode, which drove protons through the proton conducting ceramic to the catalyst. In that situation, H$_2$ dissociation occurs on the silver counter-electrode and NH$_3$ formation occurs on the commercial NH$_3$ catalyst.

Catalytic activity may also be enhanced by the application of a time-varying electric field in a capacitive manner. This approach was described for converting CO to CO$_2$ over a NiO catalyst and for converting benzene to cyclohexane over a brass catalyst in U.S. Pat. No. 3,519,546, entitled "Method of Increasing the Activity of a Catalyst in the Oxidation of Carbon Monoxide" to Lee ("Lee"). Lee discloses a method to enhance the activity of a solid catalyst with a time varying electric field on the surface. The Lee process requires the surface of the catalyst be in contact with a liquid or gaseous chemical reactant. Lee demonstrated field enhancement of the reactions CO→CO$_2$ on an oxidized Ni surface, and benzene→cyclohexane on a brass surface. In both cases, the capacitor surface was the catalytic material. Data from Lee is illustrated in FIG. 3, and shows an increase in conversion of CO to CO$_2$ varied with the frequency of the applied electric field, reaching a factor of 6.3 increase in conversion in a 100 Hz 22,000 V/cm electric field. The data in FIG. 4 illustrates that the increase in conversion of benzene to cyclohexane varied depending on both the peak-to-peak field strength and the field frequency. The conversion was increased by a factor of 3.2 in a 1,300 Hz 1,000 V/cm electric field.

Prior efforts at sustainable fuel production have focused on biofuels, H$_2$, and "artificial photosynthesis." Although ethanol and biodiesel both have higher energy density than NH$_3$, using food resources for fuel production results in higher food prices by both shifting the allocation of cropland from food to fuel and by raising the prices of the crops used for fuel production. This reallocation can cause political instability in developing countries due to higher food prices.

Hydrogen has never been able to overcome its storage density problems, although NH$_3$ can be regarded as a solution to H$_2$ storage. NH$_3$ has ~2× the energy density of liquid hydrogen at easily achieved pressures and temperatures (9 atm at 25° C.; 1 atm at −33° C.).

Although "artificial photosynthesis" could make a closed loop fuel cycle, it must extract CO$_2$ from the air to do so. NH$_3$ is a more viable route because of its high atmospheric concentration (79% for N$_2$, 0.04% for CO$_2$). Due to this difference in concentrations, synthesizing 1 mol of CH$_4$ requires processing 3,550 times as much atmosphere as synthesizing 1 mol of NH$_3$. That adds equipment and energy expense to CH$_4$ synthesis compared to NH$_3$. Furthermore, commercial air separators for atmospheric N$_2$ extraction already exist.

The lower heating value (LHV) and H$_2$ density for NH$_3$ and other fuels is shown in Table 1. NH$_3$ has roughly half the volumetric energy density of gasoline, and nearly twice that of liquid hydrogen. Its high hydrogen density (0.136 kg/L, 17.6 wt. % H$_2$) exceeds the Department of Energy's 2015 FreedomCAR targets (0.040 kg/L and 5.5 wt. % H$_2$).

TABLE 1

| Fuel | LHV (MJ/kg) | LHV (MJ/L) | H$_2$ (kg/L) |
|---|---|---|---|
| NH$_3$ | 18.6 | 14.1 | 0.136 |
| Gasoline | 42.5 | 29.8 | 0.110 |
| Ethanol | 27.0 | 21.1 | 0.102 |
| Liquid hydrogen | 120 | 8.4 | 0.070 |

SUMMARY

One object of the present invention is related to a fast-ramping NH$_3$ reactor that uses Electrically Enhanced Haber-Bosch (EEHB) to produce NH$_3$ by using nitrogen from the air, hydrogen from water, and energy from wind, solar, or nuclear power plants, and this will reduce or eliminate CO$_2$ emissions from NH$_3$ production. EEHB uses an electrically enhanced, catalyst-decorated electride support to increase NH$_3$ catalytic activity up to 130× that of a traditional Haber-Bosch reaction. The present invention can transform solar and wind power plants from facilities that must be accommodated by the grid into facilities that provide fuel for the grid and transportation. Advantageously, large and small scale wind and solar power plants can use the present invention to produce their own fuel for backup power generation to buffer intermittency, sell the NH$_3$ as a CO$_2$-free fuel or fuel additive, or sell the NH$_3$ as a CO$_2$-free fertilizer feedstock. This new ammonia source can open markets for stranded electricity generation, enable remote energy systems that need no fossil fuel for backup power, and eventually provide CO$_2$-free fuel for grid peaking power plants and transportation applications.

While not wanting to be bound by theory, the inventors believe that catalyst-decorated electride support will display a significant NEMCA effect and electric field enhancement effect due to the high mobility of the electride's intrinsic e$^-$ and reaction-produced H$^-$ anions. NEMCA is thought to improve the activity of other NH$_3$ catalysts. Other reactions have shown NEMCA reaction rate enhancements up to 5 orders of magnitude. The present invention exploits this characteristic by either applying a DC, pulsed DC, or AC bias to the catalyst-decorated electride support; or applying a time-varying electric field to the catalyst-decorated electride support. In either case, the applied voltage or electric field increases the catalyst activity by modifying the electron energies at the catalyst surface. The applied voltage or electric field can increase reaction rates by one or more of the following: enhancing e$^-$ transfer to the catalyst and/or N$_2$, promoting H removal from the catalyst by easing H$^-$ formation and incorporation into the electride, or promoting NH$_3$ formation by shifting H$^-$ energy at the catalyst-electride interface. This process can increase the activity of EEHB reactors by orders of magnitude compared to traditional Haber-Bosch reactors.

The present invention differs from prior art systems and methods because the present invention enhances Haber-Bosch reactions/reactors with the use of electrical enhancements. Prior art systems and methods do not apply electrical potentials or fields to the Haber Bosch reactions/reactors.

Furthermore, unlike Yiokari, dissociation of hydrogen and NH$_3$ synthesis of the present invention does not occur at macroscopically separate locations. Also unlike the method described in Yiokari, the method described herein does not use a proton conductor.

Unlike Lee, the reaction of the present invention is a NH$_3$ synthesis and the catalyst is a powder placed between the capacitor plates. The plates are not intentionally catalytic material. Rather, they can be steel or another conductor compatible with the $NH_3$ synthesis environment.

The electride support significantly increases Ru catalytic activity, in some instances by up to about 10-fold over current commercial $NH_3$ catalysts used in the traditional Haber-Bosch $NH_3$ synthesis process. The catalyst activity is further "electrically enhanced" using the NEMCA effect or by applying an electric field to the catalyst-decorated support. NEMCA-mode electrical enhancement of the catalyst activity uses either a DC, pulsed DC, AC, or arbitrary waveform potential. Field-mode electrical enhancement of the catalyst activity use time-varying electric potential suitable to produce a time-varying electric field in the catalyst-decorated support located between capacitive elements.

There can be multiple uses for the $NH_3$ produced using the present invention. For example, pure $NH_3$ can be run in spark-ignition internal combustion engines by employing a catalytic cracker to decompose a small fraction of the $NH_3$ into $N_2$ and $H_2$ prior to it entering the combustion chamber. This use has been demonstrated in a working hybrid electric waste disposal truck in Italy. Mixtures up to 20% $NH_3$+20% methanol+60% gasoline perform well in current unmodified gasoline engines. "Flex Fuel" engines will allow use of higher $NH_3$ concentrations. Shifting the U.S. vehicle gasoline supply to a 20% $NH_3$+20% methanol+60% gasoline blend will reduce gasoline vehicle $CO_2$ emissions by 11% with small changes to the existing fleet fuel tank and fuel lines. If future ground transportation engines are required to use $NH_3$ fuel, then $CO_2$ emissions from ground transportation will eventually drop to zero as the vehicle fleet turns over.

Models of US electricity grids show that short-term energy storage (batteries, pumped hydro, compressed air) equal to 1 day of average use will allow 80% of electricity to come from variable sources. In that model, the remaining 20% of the electricity is provided by fast-ramping gas turbines. If EEHB reactors are used to make $NH_3$ fuel to power the turbines instead of natural gas, then $CO_2$ emissions from grid electricity generation will fall to zero.

$NH_3$ is safely stored in either ambient temperature or refrigerated tanks and it is routinely transported by rail, road, and pipeline. The US has over 3,000 miles of existing $NH_3$ pipeline. Bulk liquid $NH_3$ is currently stored at 1 atm at −33.3° C. in large insulated steel tanks with 50,000 tonne capacity. Smaller amounts are stored in mild steel tanks at approximately 10 atm.

An engineering analysis of the hazards of $NH_3$ and liquefied natural gas concluded that they posed similar hazard levels. $NH_3$ vapor is lighter than air, so it quickly dissipates upward in the event of a spill. It has narrow flammable and explosive ranges and a high minimum ignition energy, further reducing its risk. In contrast, natural gas is heavier than air and has a wide explosive range. These characteristics make natural gas a major fire and explosion hazard when it leaks.

$NH_3$ and its combustion products are not greenhouse gases. Inhalation of high concentrations of $NH_3$ vapor (much higher than the olfactory threshold) can cause lung damage due to formation of ammonium hydroxide, but it is not poisonous in the toxicological sense. Its odor is easily recognized at nonhazardous concentrations, causing small leaks to be quickly noticed. It is not carcinogenic. It is biodegradable, posing no long term risks to water supplies if it leaks underground. Its characteristics are relatively benign compared to petroleum fuels.

EEHB's electrical enhancement can run in a more dynamic way than the traditional thermal-only Haber-Bosch process. This adaptability can allow EEHB reactors to better follow the ups and downs of variable energy production from wind and solar resources. Haber-Bosch synthesized $NH_3$ that uses $H_2$ electrolyzed from water instead of steam reformed from natural gas requires about 12,000 kWh of electricity per tonne of $NH_3$ produced. If the EEHB process has a higher catalytic activity and is more energy efficient than Haber-Bosch, then the energy requirement can be lower than that. If the EEHB system uses electricity from non-$CO_2$-emitting sources, it will produce fertilizer and fuel with no $CO_2$ emissions as compared to 2.1 tonnes $CO_2$ per tonne $NH_3$ for Haber-Bosch synthesis using steam reformed hydrogen.

An aspect of the invention is a method to enhance a production rate of $NH_3$ on a catalyst-decorated electride support using an electrical bias. The bias can be DC, pulsed DC, or AC electrical bias. Another aspect of the invention is a method to enhance a production rate of $NH_3$ on a catalyst-decorated electride support using an applied time-varying electric field.

An aspect of the invention is an electride supported metal catalyst. The electride supported metal catalyst can be used in NEMCA-mode (electrical potential bias) or in an electric field mode. An aspect of the invention is a method to form the electride supported metal catalyst.

An aspect of the invention is an electride supported metal catalyst. A material for the support of the electride supported metal catalyst can be selected from the group consisting of C12A7, C5A3, CA, C3A, and CaO. These supports can be used with or without an electrical enhancement, in the NEMCA-mode electrical enhancement, and electric field mode electrical enhancement. An aspect of the invention is a method to form these electride supported metal catalyst.

An aspect of the invention is a method to enhance a production rate of $NH_3$ on an electride-supported metal catalyst. The method includes providing hydrogen gas and nitrogen gas to a reactor. The reactor includes the catalyst. An electrical bias is provided to the reactor. The hydrogen gas and nitrogen gas are reacted at a temperature between about 25 and 600° C. to produce ammonia.

An aspect of the invention is a method to enhance a production rate of $NH_3$ on an electride-supported metal catalyst using a time-varying electric field. The method provides hydrogen gas and nitrogen gas to a reactor. The reactor includes the catalyst. An electrical field is provided to the reactor. Hydrogen gas and the nitrogen gas are provided to the reactor at between about 25° C. and 600° C. to produce ammonia.

An aspect of the invention is a reactor for producing ammonia from nitrogen and hydrogen gas with a supported catalyst. The reactor includes a reactor body, an inlet for providing the nitrogen and hydrogen gas to the reactor, a container with an electride-supported metal catalyst, and an outlet for receiving product gases.

An aspect of the invention is an electride supported metal catalyst. A material for the support of the electride supported metal catalyst can be selected from the group consisting of C12A7, C5A3, CA, C3A, and CaO. These supports can be used with or without an electrical enhancement, in the NEMCA-mode electrical enhancement, and electric field mode electrical enhancement. An aspect of the invention is a method to form these electride supported metal catalyst. The method includes providing a support material that is at least one of C12A7, CA, C5A3, C3A, or CaO. The support material is annealed at a temperature between about 600° C. and about 1100° C., for a duration between about 0.1 hours and about 30 hours, and in an environment comprising between about 5 vol. % and about 100 vol. % of a reducing gas. The support material is then at least partially converted to an electrically conductive support material.

An aspect of the invention is a reactor for producing ammonia from nitrogen and hydrogen gas with a supported catalyst. The reactor includes a reactor body, an inlet for providing the nitrogen and hydrogen gas to the reactor, a container with an electride-supported metal catalyst, and an outlet for receiving product gases. The support material of the electride-supported metal catalyst is selected from the group consisting of C5A3, CA, C3A and CaO.

BRIEF DESCRIPTION OF DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
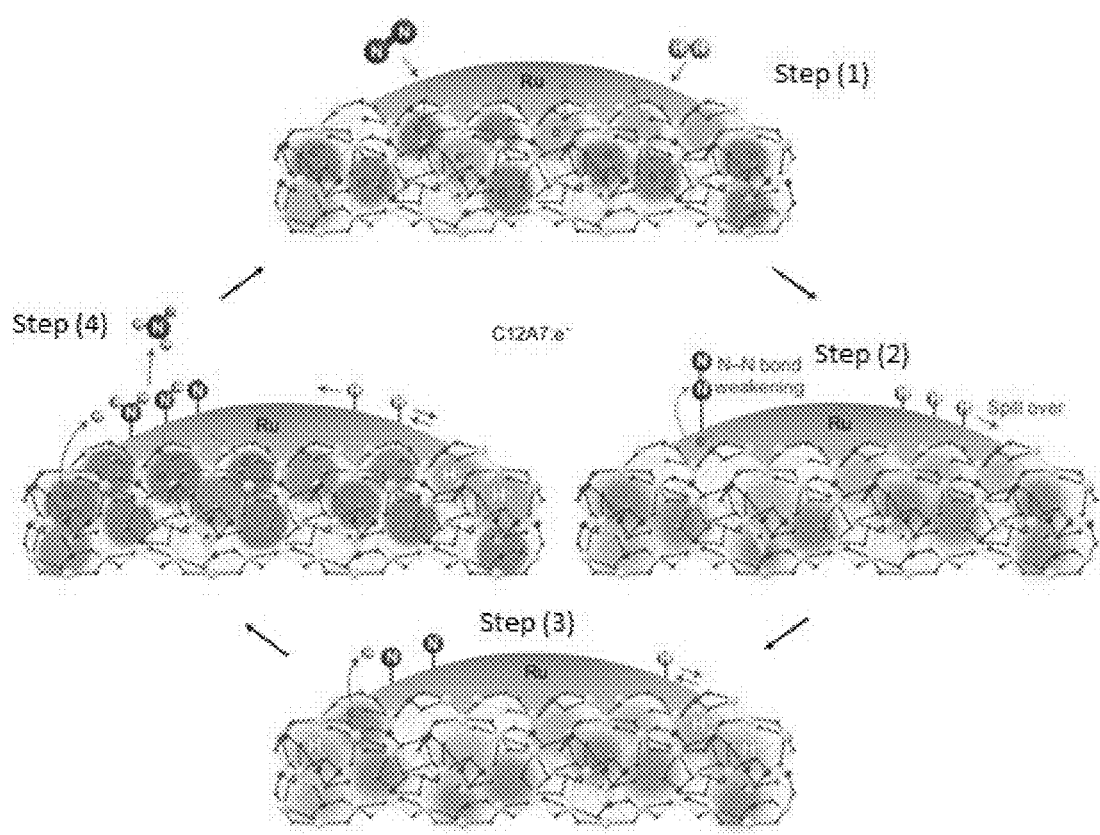
FIG. 1 illustrates $NH_3$ formation on electride-supported catalyst (from Kitano)

The present invention is directed to a method to produce $NH_3$ using EEHB, and the materials and apparatus used therein. More specifically, and as provided in greater detail below, this can be accomplished using an electride supported catalyst in the reactor. In some embodiments, an electrical current can be provided to the electride supported catalyst. Methods for making the electride support and electride supported catalyst are also provided.

Catalyst Support Materials and Synthesis

The common method for making C12A7:e− powder involves making an off-stoichiometry powder, adding Ca metal to it, and annealing in vacuum. During the process, the white, insulating, off-stoichiometry powder becomes a dark, electrically conductive, C12A7:e− electride. It is recognized in the catalyst industry that this method of C12A7:e− cannot be readily scaled up for mass production. The prior art method for making single crystal C12A7:e− are generally taught by placing a single crystal of C12A7:O (C12A7 with oxygen anions in its cages, rather than electrons) at ambient atmosphere in a closed carbon crucible and annealing it in a tube furnace purged with inert gas at around 1200 C for 10-15 h. The anneal caused the single crystal to change from clear to green and develop a charge carrier concentration around $10^{19}$ cm$^{-3}$.

The present invention is directed to a scalable method for producing C12A7:e− powder. It was found that annealing C12A7:e− powder in controlled CO atmospheres at 900 C for 15 h caused it to darken and become conductive while retaining the C12A7 crystal structure. Annealing at 100% CO for 15 h at 900 C caused complete conversion to C12A7:e−, producing material with the theoretical maximum charge concentration for this material. Annealing at CO concentrations less than 25% caused the C12A7 powder to darken progressively less and not become measurably conductive. Although it was not measured, it is likely that CO concentrations between 25% and 100% cause intermediate charge carrier concentrations.

Furthermore, and in one aspect of the invention, it was found that annealing other calcium aluminates in an environment of about 5 vol. % to about 100 vol. % CO, in some embodiments about 100 vol. % CO (which reduces the required annealing time) at between about 600° C. and about 1100° C., in some embodiments about 900° C. (which quickly results in a conductivity change while minimizing or eliminating the chance of calcium aluminate phase change) for about 0.1 to about 30 hours in some embodiments between about 1-15 hours (which maximizes the high carrier concentration while minimizing or eliminating the chance of causing unwanted calcium aluminate phase changes) also causes them to change from white, electrically insulating powders to dark, electrically conductive powders while retaining their original crystal structure. In addition to C12A7, this behavior has been observed in CA, C5A3, and C3A (known as celite) calcium aluminates. The rate of conversion of the C12A7 powder to an electride is dependent upon the parameters such as the concentration of a reducing agent (in this example, CO can be used as a reducing agent, though other reducing agents can also be utilized without deviating from the invention), the temperature of the reaction and the time of the reaction. The lower any of these parameters are, then the longer the conversion reaction will take. Other calcium aluminate powders can also be used, including CA, C3A, and C5A3, and combinations thereof.

Annealing CaO (calcium oxide, C in cement chemistry notation) in about 5 vol. % to about 100 vol. % CO, in some embodiments about 100 vol. % (which reduces the required annealing time) at between about 600° C. and about 1100° C., in some embodiments about 900° C. (which results in a quick quickest conductivity change while minimizing the chance of phase change) for about 0.1 to about 30 hours, in some embodiments about 1-15 hours (which maximizes the high carrier concentration while minimizing the chance of causing unwanted phase changes) converts it from a white, insulating powder to a dark, electrically conducting powder while retaining its original crystal structure. This material is mentioned separately from CA, C3A, C5A3, and C12A7 because it is not, strictly speaking, a calcium aluminate. However, it responds to the CO anneal in a similar manner as the calcium aluminates.

In the case of C12A7, annealing in hydrogen does not cause C12A7:O to fully convert to C12A7:e− like annealing in CO does. A reducing agent with similar Gibbs free energy as a function of temperature as CO should also cause conversion of calcium aluminates and CaO from electrically insulating to electrically conductive materials.

FIGS. 9, 10, 11, 12, and 13 illustrate x-ray diffraction patterns of C3A, 82 wt. % C5A3, C12A7, CA, and CaO, respectively, before and after annealing in about 100 vol. % CO for about 15 hours at about 900° C. In each case, the x-ray diffraction pattern illustrates no significant change even though the material converted from a white, electrically insulating powder to a dark, electrically conductive powder. These patterns indicate that the material underwent an electronic change like electride conversion or semiconductor doping, rather than a change in chemical stoichiometry or crystal structure.

Conversely, calcium aluminates C3A (also known as celite) and CA change from white, electrically insulating powders to off-white, electrically insulating powders after being annealed in about 10-100 vol. % CO, in some embodiments about 100 vol. % CO to reduce annealing time) at about 1100-1300° C., in some embodiments about 1200° C., for about 0.1-30 hours, in some embodiments about 6 hours. This suggests an upper temperature limit for the conversion process.

Figure 9:
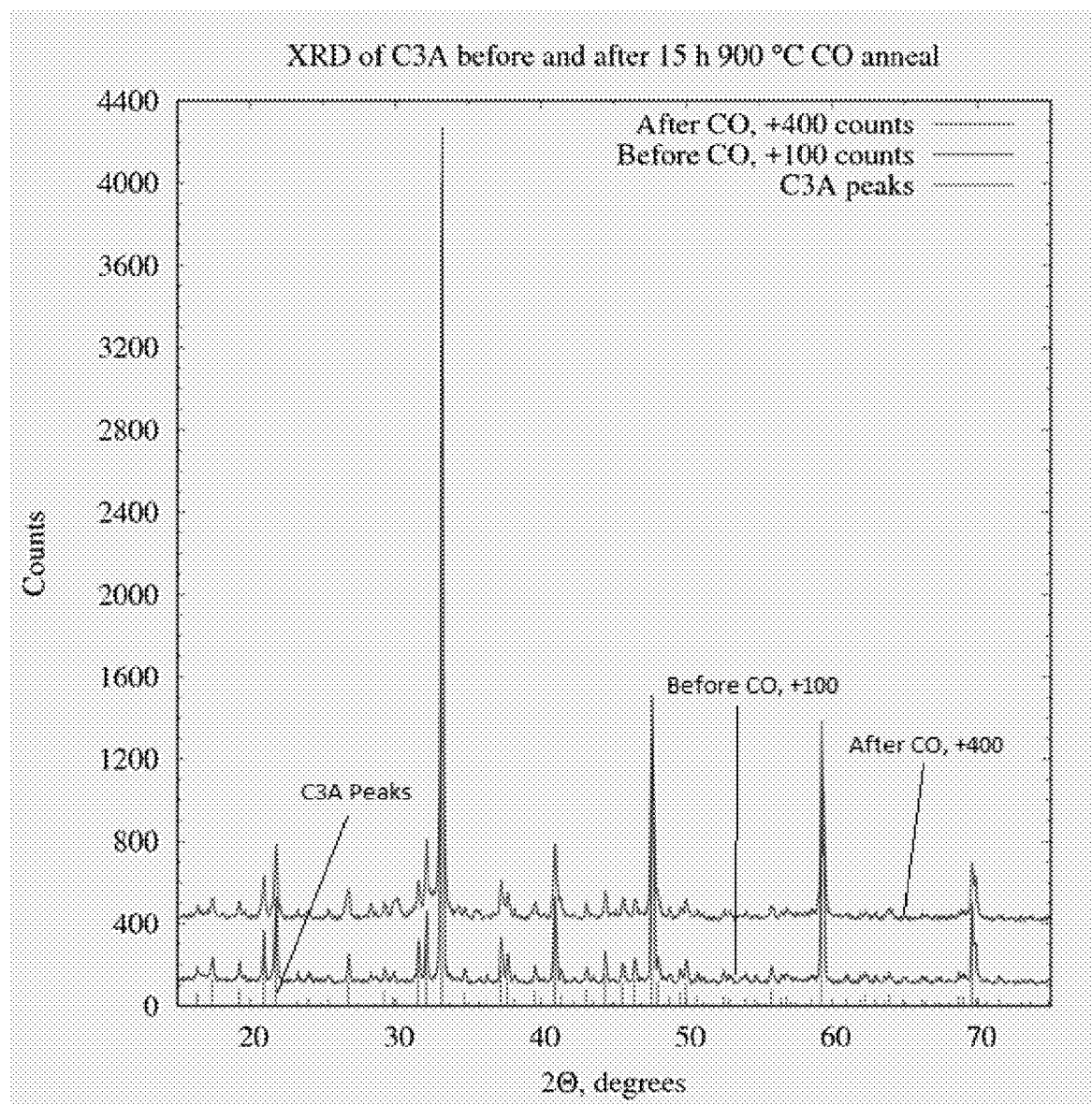
FIG. 9 illustrates the x-ray diffraction patterns of $C_3A$ before and after being annealed in CO.
Figure 10:
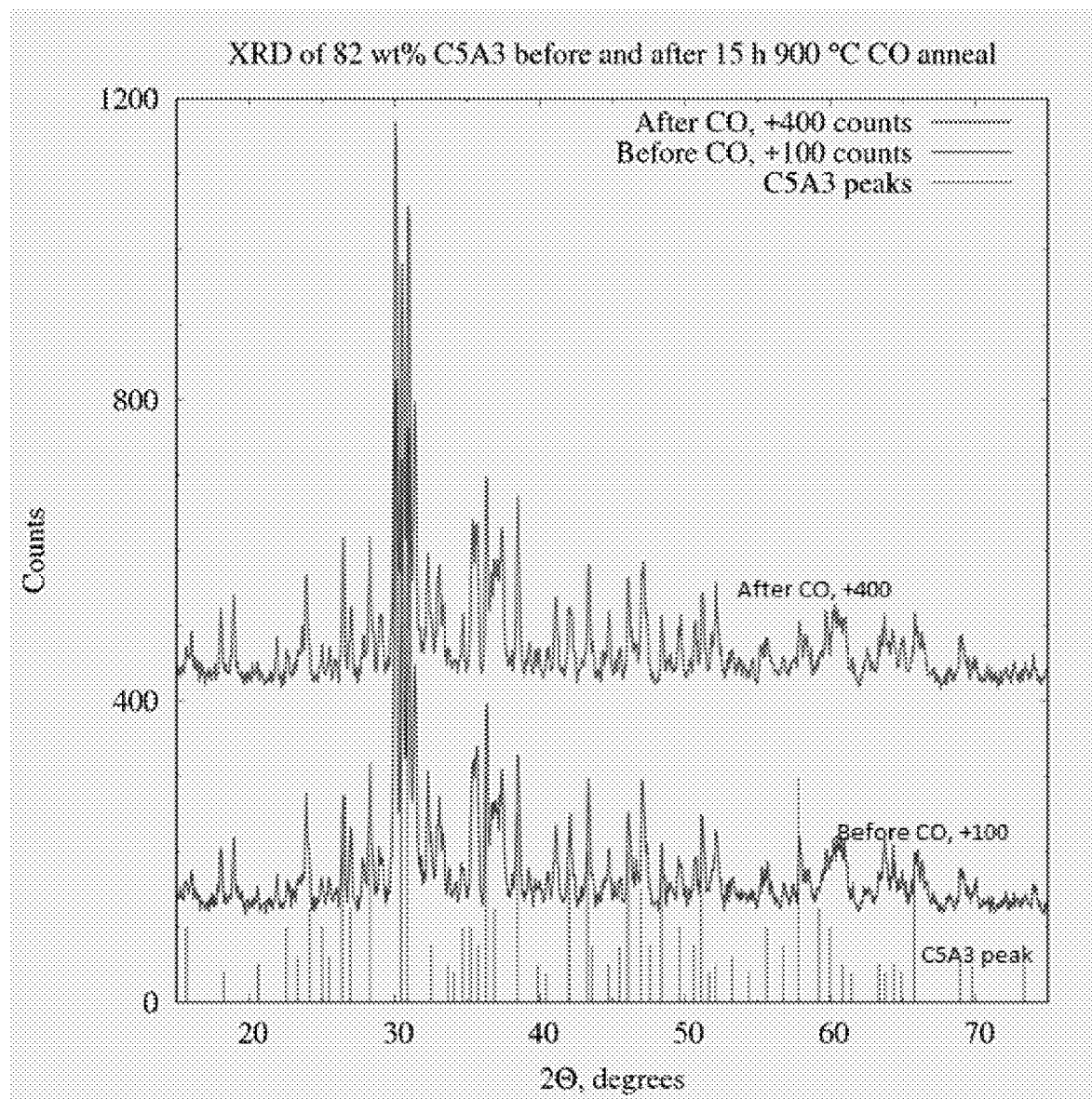
FIG. 10 illustrates the x-ray diffraction patterns of C5A3 before and after being annealed in CO.
Figure 11:
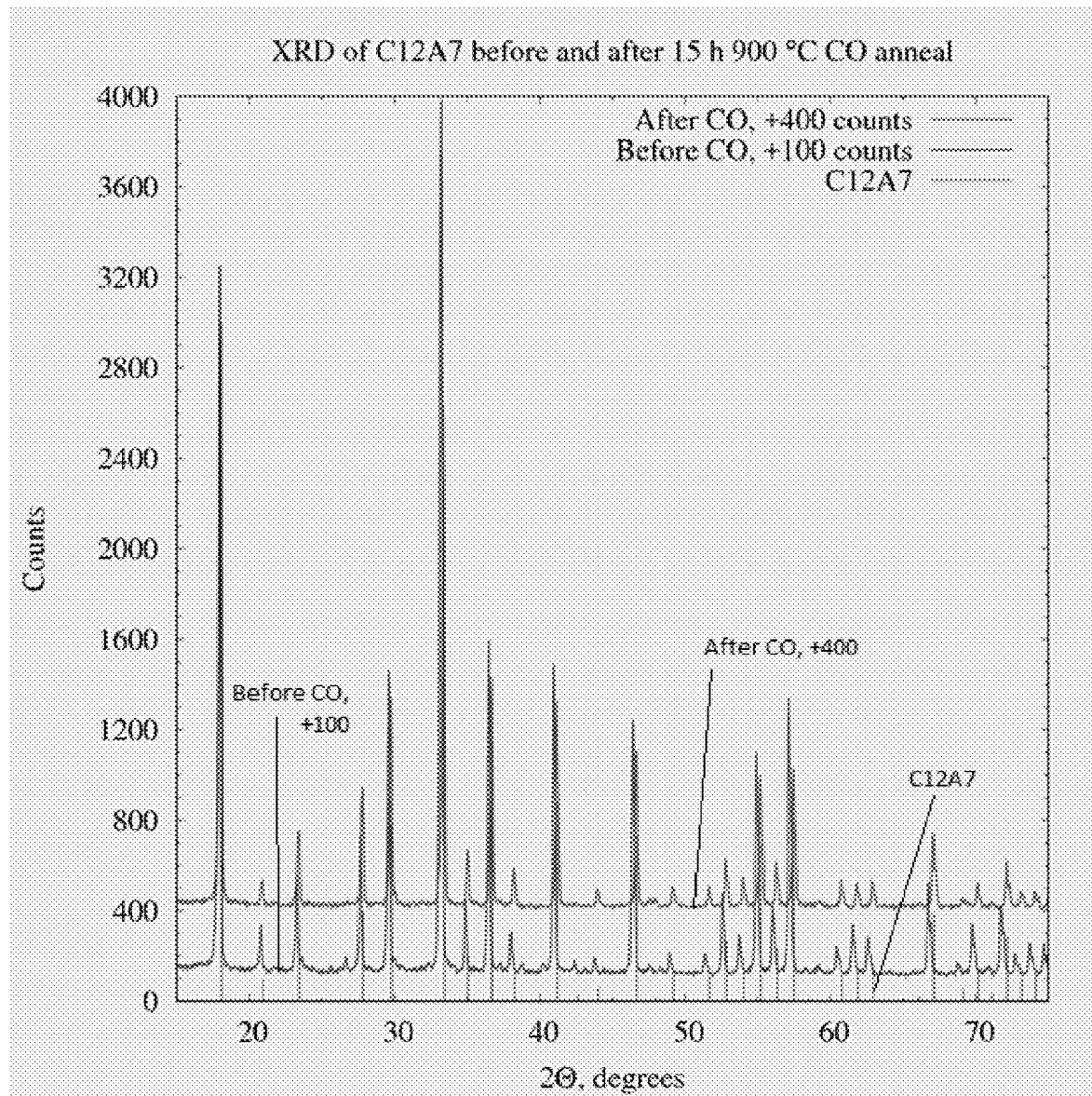
FIG. 11 illustrates the x-ray diffraction patterns of C12A7 before and after being annealed in CO.
Figure 12:
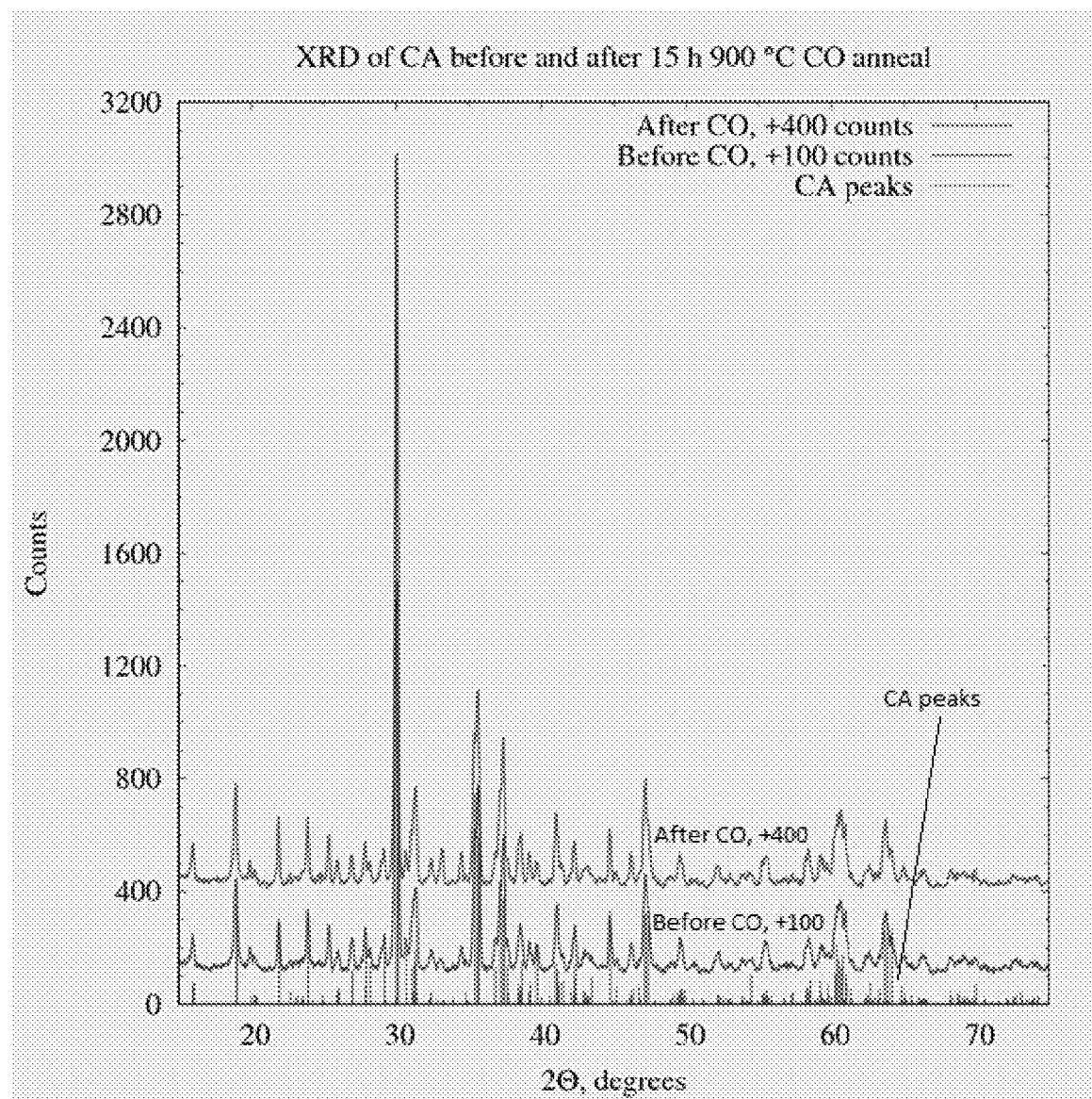
FIG. 12 illustrates the x-ray diffraction patterns of CA before and after being annealed in CO.
Figure 13:
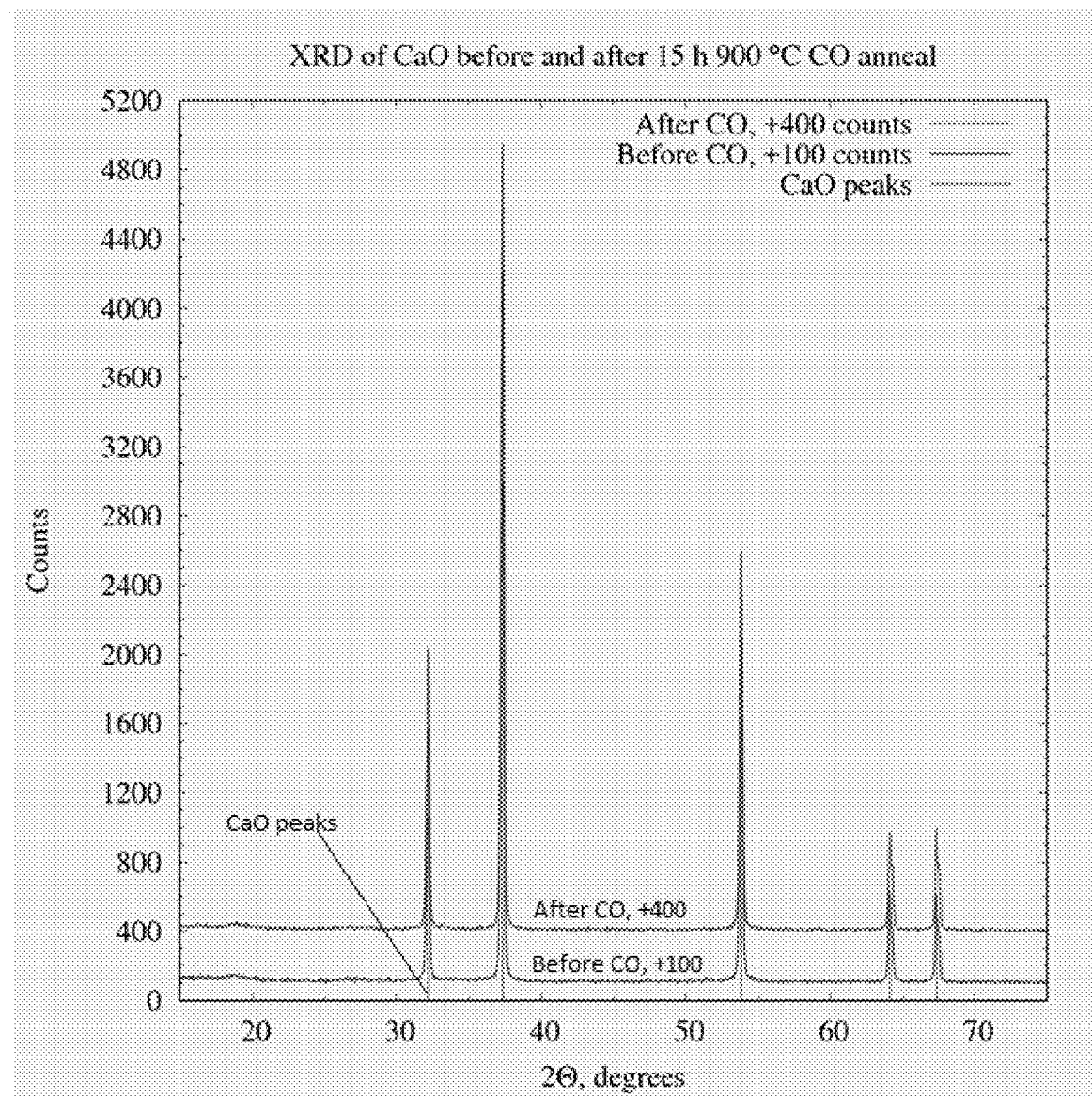
FIG. 13 illustrates the x-ray diffraction patterns of CaO before and after being annealed in CO.

It is generally known that annealing C12A7 in a dry anoxic environment causes it to decompose to C5A3. The present invention relates in one embodiment to annealing C12A7 in a CO atmosphere for about 6 hours at about 1200° C. results in a dark, electrically conductive powder with a large mass fraction (over about 80 wt. %) of C5A3. FIG. 9 illustrates x-ray diffraction patterns for the resulting darkened and conductive C5A3 electride powder. There are some peaks associated with CA and C12A7 in the pattern, but most of the peaks and peak area are associated with C5A3. This suggests that the C12A7 mixture is being converted to a C5A3 electride in a manner similar to the C12A7 to C12A7:e− conversion. Increasing the temperature to greater than about 1300° C. begins to sinter or melt the powder, producing a fused mass.

C5A3 can also be made conductive by first converting C12A7 to C5A3 and then making the C5A3 conductive. The C12A7 was converted to C5A3 by annealing it in vacuum at about 1000-1200° C. (preferably 1100° C.) for about 1-12 hours (preferably 6 hours). This converts the C12A7 to about 80 wt. % C5A3 and 20 wt. % other calcium aluminates. Attempts were made to make phase pure C5A3 by annealing a mixture of C12A7 and $Al_2O_3$ with C5A3 stoichiometry (about 0.015 g $Al_2O_3$ for each 1.000 g C12A7) under the same conditions, but the product was still about 80 wt. % C5A3. In both cases, the white, electrically insulating C5A3 could be converted to a dark, electrically conductive C5A3 by annealing in about 100 vol. % CO for about 15 hours at about 900° C. This suggests that the C5A3 is being converted to a C5A3 electride in a manner similar to the C12A7 to C12A7:e− conversion.

The compounds CA, C5A3, C3A, and CaO can be electrides or have some other conductivity mechanism at work (for example, oxygen vacancies). While not wishing to be bound by theory, the electrically conducting forms of C5A3, C3A, CA, and CaO can enhance $NH_3$ synthesis in the same manner that C12A7:e− does, but does not require an electrical bias. An electrical bias can be used. It is believed that the electrically conductive C5A3, C3A, CA, and CaO can also have low work function and the ability to incorporate hydrogen atoms as H− hydride ions like C12A7:e− does. It has recently been reported that calcium nitride enhances $NH_3$ synthesis, and it does not have a cage structure like C12A7 does. However, it does have the ability to form hydride ions and its calcium cations can enhance catalysis by creating local regions with low work function. This lends credence to the speculation that electride forms of C5A3, C3A, and CA can also enhance $NH_3$ synthesis.

The specific surface areas (surface area per unit mass) of C12A7, C5A3, C3A, CA, and CaO have all been increased by planetary ball milling with a nonaqueous solvent. Support materials can be made with specific surface areas. In some embodiments, the surface area of the support material can range from about 1 to 100 $m^2/g$, in some embodiments about 20 $m^2/g$ to 80 $m^2/g$. In general, a higher specific surface area can be preferable as it allows more catalyst to be supported by a given mass of support. However, if the high surface area is achieved by material with pore spaces that have very slow transport times (a tortuous path so the reactants and products take a long time to/from the catalytic sites), then the increased surface area may not result in a better catalyst decorated support. Thus, there is a balance between the surface area and the porosity of the support material.

Decoration of Support Material

An aspect of the present invention is a method to decorate a support material, and the resulting decorated support. The present invention utilizes incipient wetness techniques and a ball milling technique to decorate the support materials with a metal material, such as Ru. Incipient wetness is a common decoration method in which a metal compound is dissolved in a solvent to form a solution, the support powder is wet with that solution, the solvent is allowed to evaporate from the support powder, and then the remaining dispersed metal compound is converted to metal by an appropriate anneal known by those skilled in the art. For example, Ru carbonyl can be converted to Ru or Ru oxide by annealing in steps up to about 250 ° C. in either an inert or oxygen-containing atmosphere. $RuCl_3$ hydrate can be converted to Ru oxide or Ru metal in a similar way by annealing at 450° C.

The solvent used with the method to decorate the support material will depend upon the material being dissolved in the solvent. Thus, a comprehensive list of solvents is not possible. However, the material to be dissolved will be highly soluble in the solvent, and the solvent will evaporate quickly under the process conditions. Furthermore, the temperature and the atmosphere can be varied to achieve the desired results. In some embodiments, the decoration process can be performed at room temperature and the solvent can be a non-aqueous solvent (since some of the materials will hydrate or change phase when an aqueous solution is used). In general, non-aqueous solvents can typically be used with metal-organic compounds, while salts of the desired metal that have high solubility in water can typically utilize aqueous solvents. In either case, however, the solvent must also be compatible with the support material.

The calcium aluminate and CaO support powders are all cement-formers, and thus are altered by water. Thus, a non-aqueous solvent must be used for incipient wetness Ru decoration. Ru carbonyl and $RuCl_3$ are not strongly soluble in organic solvents, which increases the amount of solvent that must be used and evaporated.

The catalyst dispersion is the percentage of the catalyst atoms that are at a free surface and thus able to interact with the reactants. The catalyst dispersion can range from about 0.1% to about 90%, in some embodiments about 0.1% to about 50%. Catalyst dispersion of between about 40-60% dispersion, in some embodiments about 50%, dispersion, corresponds to catalyst islands just a few nanometers in diameter.

Catalyst decorated supports ranging from about 0.5 wt. % to about 20 wt. % metal, in some embodiments Ru, can be used. In some embodiments, the catalyst decorated supports can range from 0.05 wt. % of the metal to about 5 wt. % of the metal. In general, the metal dispersion decreases after a critical wt. % of the metal is exceeded because the metal starts to make larger islands instead of making more small ones, which is more desirable. Furthermore, the amount of catalyst supported can depend upon the support material. For example, calcium amide can support a higher weight of a metal than some other support materials while maintaining a high dispersion. Furthermore, although catalyst loading is normally given in wt. %, that amount can be misleading when comparing different support materials or different catalysts because each material has a different molecular mass. For example, iron (molecular weight about 55.85) is much lighter than ruthenium (molecular weight about 101.1), so a support with 1 wt. % Fe would have many more catalyst atoms than one with 1 wt. % Ru. In the end, optimal catalyst loading is determined empirically. For example, if going from 1 wt. % Ru to 2 wt. % Ru only increases the activity by 25%, it may be more economical to use 25% more 1 wt.% Ru decorated support in the reactor.

Another aspect of the invention is directed to an alternative method of decorating the support powders with a metal, such as Ru. Either Ru carbonyl or $RuCl_3$ hydrate powders are added to the support powder along with enough organic solvent, nonlimiting examples include acetone or heptane, to make a loose paste. This paste is milled in a ball mill, nonlimiting examples include a planetary ball mill, for between about 5 minutes to about 1 hour, in some embodiments about 30 minutes, and at a speed between 100 rpm to about 1000 rpm, in some embodiments about 400 rpm. The speed of the ball mill can depend upon the model of the ball mill used in the process. This method breaks up the Ru compound and disperses it on the support powder without requiring it to be fully dissolved in the solvent. The milled Ru+support paste can be baked or annealed using methods and parameters known to those skilled in the art for a particular metal compound to convert the Ru compound to Ru metal or Ru oxide. $RuCl_3$ hydrate is the preferred Ru compound because it is much cheaper than Ru carbonyl.

Although this method can produce highly dispersed Ru, in some embodiments a dispersion up to about 90%, it also causes the conductive support powder to become non-conductive, likely due to surface damage on the powder particles. Exposing the electrically conductive support powders to the Ru compound and solvent without milling does not remove its conductivity, and milling the conductive support powders without the Ru compound does remove its conductivity. The powder still retains its dark color, and therefore is still an electrically conductive core surrounded by a more insulating shell, which can be suitable to the $NH_3$ synthesis enhancement.

The insulating shell can be beneficial to electrical enhancement because it will allow the CO-annealed powder to be used in an electric field mode as the insulating powder would not short circuit the capacitor plates. If the insulating shell still allows hydride ion transport and/or retains features that foster $N_2$ activation, it can be beneficial.

Differential Reactor for Catalyst Activity Testing

The catalyst-decorated electride's ability to catalyze $NH_3$ can be tested at the lab scale in a small differential reactor. One skilled in the art would understand that a laboratory model can be scaled up.

Figure 5:
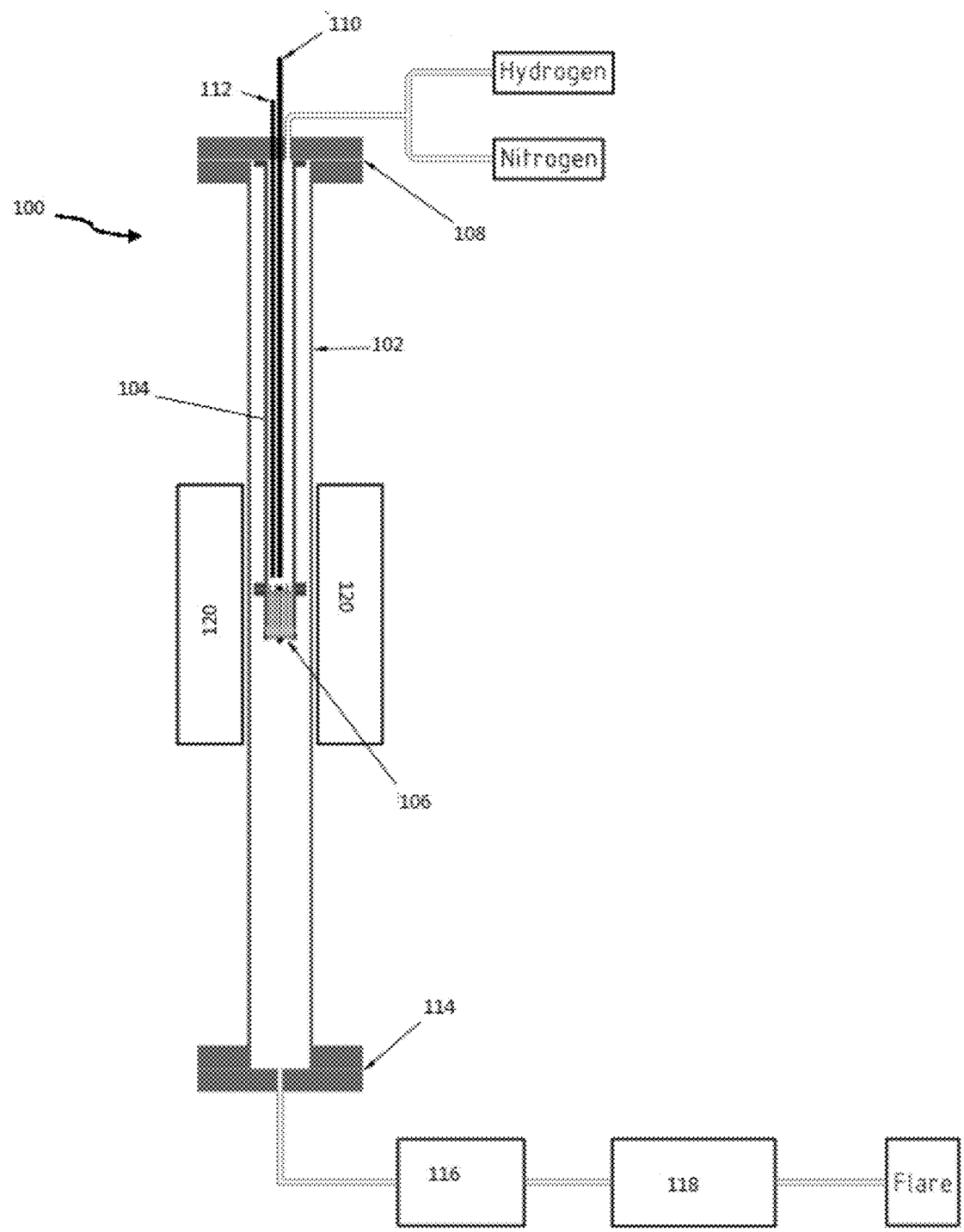
FIG. 5 illustrates a schematic diagram of the EEHB lab-scale test reactor.

A schematic diagram of an embodiment of a reactor is illustrated in FIG. 5. The reactor 100 used in the design of the invention was a "tube in a tube" design in which the outer tube 102 is a pressure vessel and the inner tube 104 directs gas flow through an interchangeable cup 106 that contains the catalyst. Hydrogen and nitrogen gas are admitted to the reactor by mass flow controllers connected to the inlet flange 108 of the reactor. The nitrogen and hydrogen flow rates can maintain a desired gas mixture, $NH_3$ production rate, $NH_3$ concentration, space velocity, or linear gas velocity in the reactor. A thermocouple 110 that measures the catalyst temperature and electrical connections that provide bias 112 to the catalyst also enter the reactor 100 through feedthroughs in the inlet flange 108. The central portion of the reactor 100 is heated with heaters. The heaters can be insulated resistive heaters 120 that can heat the reactor 100 from room temperature to about 650° C. In some embodiments, the temperature in the reactor can be between about 300° C. and about 600° C. In some embodiments, the temperature in the reactor can be between about 450° C. and about 480° C. The product gases exit the reactor 100 through the outlet flange 114. The pressure in the reactor 100 is monitored downstream of the outlet flange with a pressure sensor 116. The reactor pressure can be controlled by a backpressure regulator 118 located downstream of the pressure sensor 116 that can raise the reactor pressure to about 150 psig. This pressure was chosen to ensure that at high temperature operation softening of the reactor's outer wall would not cause it to rupture. If the reactor components are sufficiently strong, higher pressures can be used. A practical upper limit to the reactor pressure is the pressure at which the $NH_3$ condenses to a liquid. $NH_3$ condensation can cause inaccurate $NH_3$ production measurements or compromise the operation of the reactor. The specific total pressure at which $NH_3$ condensation will occur depends on the $NH_3$ concentration in the reactor and the reactor temperature. In some embodiments, the pressure can be between about 0 and about 140 psig. Higher pressures can result in higher synthesis rates. Product gases exiting the backpressure regulator 118 are at ambient atmospheric pressure. The product gas $NH_3$ concentration is measured by a device downstream of the backpressure regulator 118. The product gases can be flared (i.e. ignited) to convert the $NH_3$ and any unreacted $N_2$ and $H_2$ reactants to nitrogen and water so they can be safely exhausted to atmosphere for disposal.

The inner tube 104 of the reactor 100 extends from the bottom side of the inlet flange 108 to near the center of the reactor 100, where it terminates in a flange. An interchangeable cup 106 containing the catalyst-decorated electride support is attached (e.g. bolted, adhered, etc.) to that flange. The cup 106 can be easily changed to allow changes to its size, shape, and electrode configuration. While FIG. 5 illustrates the cup near the center of the reactor, this position is not required. Rather, the cup simply needs to be in a region with uniform temperature. The cup diameter can be adjusted so that the gas flow rates produce a linear gas velocity that removes stagnation layers from the catalyst-decorated support particles. The length of the cup can also be adjusted for a given diameter so that the cup contains enough catalyst to produce a measured concentration of $NH_3$. In some embodiments, between about 0.1 grams and about 50 grams of the catalyst can be used in the cup. The bottom of the cup 106 can be porous to allow gas to flow through it. In operation, the reactant gases flow through the inner tube 104, through the catalyst-decorated electride support in the cup 106, and out the outlet flange 114 of the reactor 100. The inner tube 104 and cup 106 can be electrically isolated from the rest of the reactor 100 by using an electrically insulating gasket and ceramic bolt sleeves at the inner tube's attachment to the inlet flange 108.

Suitable materials for the insulation can include Kevlar fiber reinforced BUNA rubber gasket materials, or other suitable materials. Any suitable material can be used for the reactor flanges, tubing, walls, and catalyst cup. In some embodiments, the material can be stainless steak or a non-stainless steel alloy. Some or all of the reactor can be coated for corrosion protection. In general, materials selected for the reactor are compatible with $NH_3$. Steel is a cheap option, as are most ceramics and BUNA elastomer seals. Specific incompatible materials are copper alloys, aluminum alloys, and viton elastomer seals.

Figure 6:
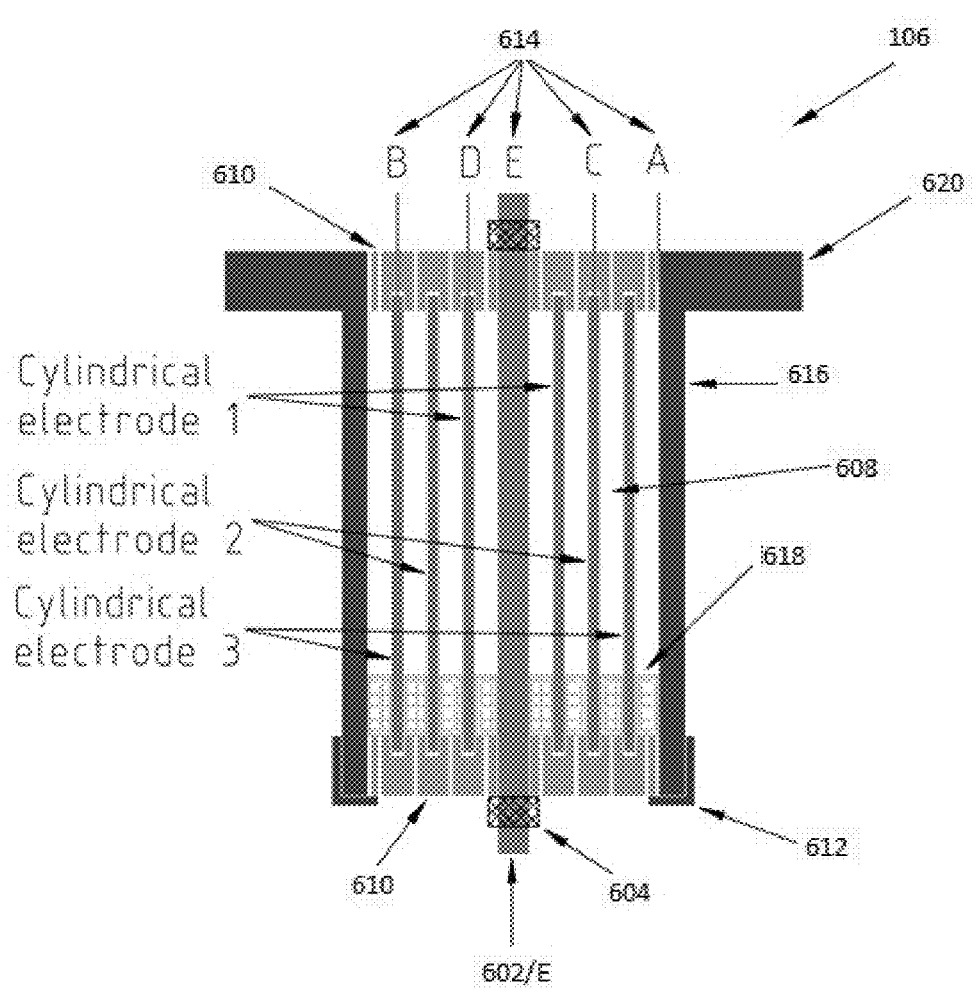
FIG. 6 illustrates a version of the replaceable catalyst cup that can be used for unbiased, NEMCA-mode electrically enhanced, and field-mode electrically enhanced $NH_3$ synthesis measurements.

FIG. 6 illustrates a configuration of the catalyst cup featuring concentric cylindrical electrodes in an embodiment of the invention. The top and bottom of the electrodes 614 (e.g. A-D) rest in circular grooves in ceramic disks 610 at the top and bottom of the cup, which fix the electrode separation. The electrodes can be supported by ceramic disks 610. The ceramic disks 610 can maintain electrode separation and support the electrodes and fiber materials that keep the catalyst-decorated electride support from falling through the gas flow openings in the ceramic discs. Support tabs 612 can be used to support the ceramic disks 610. The minimum separation will be limited by the ability to put catalyst powder between the electrodes and the ability to keep the electrodes from touching each other if they warp when heated. In some embodiments, the spacing can be a minimum of about 1 mm. The maximum spacing can be limited when the reactor is in field enhancement mode as this mode requires electrodes capable of applying a sufficient electric field given power supply voltage limitations.

The electrode spacing can be adjusted to allow easy loading of catalyst-decorated electride support between the electrodes and generation of the desired electric field strength (V/cm) for the available voltage. For example, if the desired field strength is about 20,000 V/cm peak to peak and the available power supply outputs about 2000 V peak to peak, then the electrode separation needs to be about 0.1 cm. A center threaded electrode rod 602 can be used to clamp the ceramic disks rigidly to the cylindrical electrodes and secured with a nut or fastener end 604. The ceramic disks have holes in the regions between the electrodes 608 to allow gas to flow through the catalyst-decorated electride support. Wires extend from the electrodes through the upper ceramic disk to allow electrical bias to be applied to them. A dopant is not required to increase the conductivity of the system. Rather, the wires can be attached to the electrode, for example by welding, soldering, or contact with fasteners. The cup flange 620 connects the cup 106 to the inner flange illustrated in FIG. 5. The cup wall 616 provides an exterior surface of the cup 106 and can act as an electrode using electrode connection A. The ceramic fiber 618 is porous enough to allow gases to flow through it, but dense enough to prevent the catalyst-decorated electride support from falling through the gas flow openings in the ceramic disks 610.

The catalyst cup implementation illustrated in FIG. 6 allows the catalyst to be tested (a) without any bias, (b) in a non-current-passing NEMCA-mode electrically enhanced configuration if an electrically conductive catalyst is used and the cup and its electrodes (A, B, C, D, E) are all connected to a voltage source that applies a voltage relative to the grounded reactor body, (c) a current-passing NEMCA-mode electrically enhanced configuration if an electrically conductive catalyst is used and the electrodes are alternately connected to the positive and negative outputs of a power supply (for example electrodes A, C, and E connected to the positive potential and electrodes B and D connected to the negative potential), and (d) a field-mode electrically enhanced configuration if an electrically non-conductive catalyst is used and the electrodes are alternately connected to the positive and negative outputs of a power supply (for example electrodes A, C, and E connected to the positive potential and electrodes B and D connected to the negative potential).

The catalyst cup implementation illustrated in FIG. 6 can be modified by replacing electrodes B and D with electrical insulators (for example, ceramic cylinders). In this arrangement, electrodes A and E can be connected to the positive output of a power supply and electrode C can be connected to its negative output (or vice versa). One skilled in the art would understand that other configurations can accomplish the end result without deviating from the invention. An electrically conductive catalyst-decorated support can be placed between each of the cylinders. When an electrical bias is applied, charge can be moved from the catalyst-decorated support in spaces A-B and C-D to that in spaces B-C and D-E. A NEMCA-mode electrical enhancement can be achieved by applying an AC, pulsed DC, or arbitrary waveform between the power supply terminals. This waveform can alternately enhance $H_2$ activation, $N_2$ activation, or intermediate species formation, causing the overall $NH_3$ synthesis rate to be increased. In effect, the catalyst-decorated electrically conductive support in each space can alternately act as a counter electrode or working electrode as the applied potential changes in time.

The C12A7:e− electride can act as a support for any $NH_3$ catalyst. A catalyst can decorate the support (i.e. applied to the surface of the support). The catalyst can include, but is not limited to, a metal oxide, a metal nitride (cobalt molybdenum nitride, for example), a metal (including promoted iron), an alkali promoted iron catalyst, and combinations thereof. In some embodiments, the catalyst can be a metal oxide, such as an iron oxide. In some embodiments, the catalyst can contain a metal, for example any Group VIII metal, such as ruthenium, iron, osmium, nickel, palladium, platinum or combinations thereof. In some embodiments, the catalyst can be an alkali promoted metal oxide catalyst, for example an iron oxide potassium oxide catalyst. In some embodiments, the catalyst can be an alkali promoted metal catalyst, for example Cs promoted Ru metal. A "promoted" catalyst refers to an added material to the catalyst that results in the catalyst having a higher activity. In the case of $NH_3$ catalysts, alkali metals (Cs, K, Na, etc.) are often added to the metal, for example Ru or Fe, to increase the Ru or Fe activity. Typically, the alkali metals do not do not catalyze $NH_3$ synthesis on their own, rather these metals help Fe and Ru work better.

The amount of catalyst-decorated electride support used can depend on the reactor and the desired production rate. By way of non-limiting example only, in some embodiments, between about 0.01-2 kg of catalyst can be used.

Lab testing of the catalyst-decorated electride support can examine reagent flows, $N_2$:$H_2$ ratios, total pressures, temperatures, and electrical enhancement parameters such as applied voltage, applied electric field strength, and the frequency and form of time-varying applied voltages and electric fields. The test parameters can be chosen to ensure high reaction site availability and thus accurate measurement of the reaction rate. For example, the reagent flow rate should be high enough that further increases in flow rate do not cause increased $NH_3$ synthesis rate. Under that condition, the reaction rate is only limited by the catalytic activity, rather than diffusion through a gas stagnation layer around the catalyst-decorated support particles. Experiments suggest that optimal $H_2:N_2$ ratios can range from about 3:1 to about 1:1. The total pressure can be adjusted in combination with $H_2:N_2$ ratios to create different reagent partial pressures to elucidate the partial pressure dependence of the rate law. Temperature can range from room temperature to about 650° C., although experiments suggest a preferred range of about 350-500° C. This configuration is chosen because it is much more difficult to elucidate reaction kinetics using integrated rate laws, and accurate reaction rate information is essential to larger reactor modeling. The rate parameters can be determined by regression of the experimental data.

Reaction kinetics can initially be measured without electrical bias. Catalysts with good performance without electrical bias can then be tested with NEMCA-mode or field-mode electrical enhancement. In some embodiments, when NEMCA is used, the process can begin with a DC "no current" configuration, which would apply a potential to the catalyst relative to ground. In some embodiments, a current-flowing configuration, which is between adjacent plates, can be used. Once a flow has been established, then the current can be steady or pulsed.

When an optimum DC bias for NEMCA-mode electrical enhancement is found, the effect of applying pulsed DC bias at that potential using different pulse frequencies and duty cycles can be examined. While not wanting to be bound by theory, it is believed that a pulsed DC potential can have a larger NEMCA effect than a DC potential because it can temporally organize the intermediate reactions. For example, one potential may be optimal for removing H atoms from the Ru islands by converting them to trapped H_, another may be optimal for injecting electrons from the Ru into the $N_2$ to weaken its triple bond, and a third might be optimal for fostering reactions between trapped H_ and excited $N_2$ to form $NH_3$. By pulsing between these potentials, the net reaction rate can be increased by first maximizing $N_2$ adsorption on the Ru, then maximizing electron injection to the adsorbed $N_2$, and then maximizing excited-state $N_2$ conversion to $NH_3$.

When an optimum sinusoidally varying AC frequency is used for field-mode electrical enhancement, further optimization can be achieved by altering other wavefunctions such as triangle waves, square waves, stepped waves, and arbitrary wavefunctions. While not wanting to be bound by theory, it is believed that an arbitrary wavefunction can have a larger electric-field-enhancement effect than a sinusoidal one because it can provide different field strengths and durations to temporally organize the specific intermediate reactions for $NH_3$ formation. It is likely that the optimal peak-to-peak amplitude and frequency will depend on the specific wavefunction.

Production Reactor for $NH_3$ Synthesis

Other reactors can be used in practice, including reactors that harvest the $NH_3$ and recirculate the unreacted $N_2$ and $H_2$ through the reactor or pass it to a subsequent reactor for use. $NH_3$ can be harvested by condensing it from a product gas or absorbing it into a material or filtering it from a product gas. In some embodiments, the material can absorb the $NH_3$, which can be for example, $MgCl_2$. Such reactors can also add nitrogen and hydrogen gas via the inlet to maintain the reactor pressure.

Reactors intended for production of $NH_3$, rather than catalyst testing, can be operated at higher pressures to both increase the $NH_3$ synthesis rate and increase the temperature at which the $NH_3$ can be liquefied, adsorbed, or absorbed for extraction from the product stream. Such reactors can use internal heating of the catalyst to allow the reactor walls to operate at a lower temperature by being either actively or passively cooled. This can help maintain their structural strength and ability to contain higher operating pressure.

EXAMPLES

Example 1

The lab-scale differential test reactor described above has been used to test the non-electrically enhanced $NH_3$ synthesis capability of Ru-decorated C12A7:e−. The catalyst support was a −45 mesh powder with a surface area of 6.2 $m^2$ $g^{-1}$ as measured by nitrogen BET analysis. Its surface was decorated with 1 wt. % Ru with 26% dispersion as measured by pulsed CO chemisorption.

The catalyst cup used for the measurement was that shown in FIG. 6, but with the electrode assembly removed. The bottom of the cup was fit with a stainless steel screen. A 6 mm layer of ceramic fiber insulation was placed on top of the screen to support the catalyst powder. The cup was loaded with 5.081 g of catalyst, which created a catalyst bed approximately 1.5 cm deep.

Figure 7:
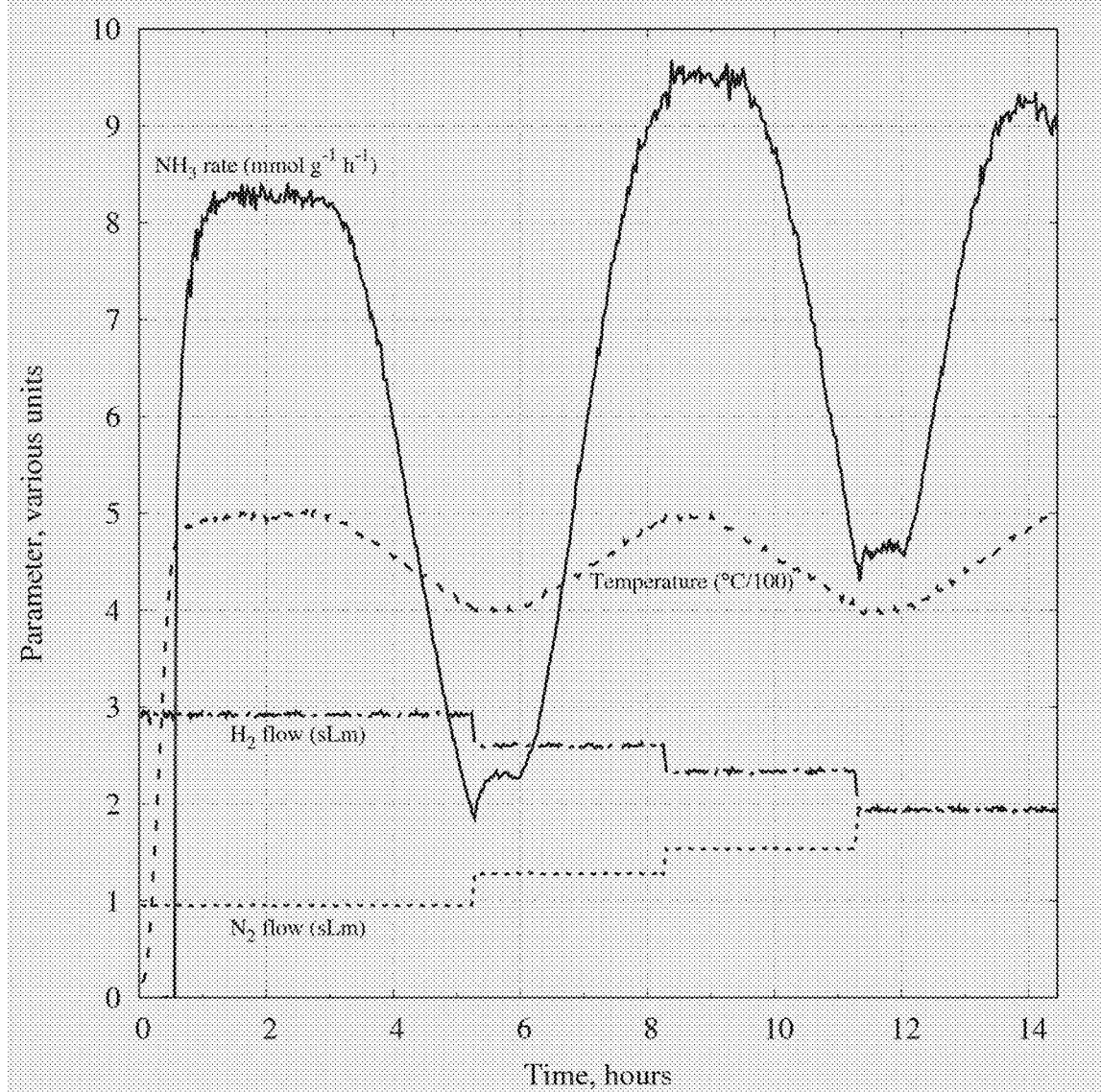
FIG. 7 illustrates the performance of Ru-decorated C12A7:e− in the lab-scale test reactor.

The reactor was run at a total pressure of 140 psig and a total flow of 4 sLm. The $H_2:N_2$ ratio was successively maintained at nominal values of 3:1, 2:1, 1.5:1, and 1:1. At each gas ratio, the reactor's internal temperature was ramped from approximately 400° C. to 500° C. at a rate of 50° C. $h^{-1}$ while the rate of $NH_3$ formation was monitored by a non-dispersive infrared sensing method (Bacharach model AGMSZ detector). The data from the measurements is illustrated in FIG. 7. The $NH_3$ synthesis rate peaked at approximately 9.54 mmol $g^{-1}$ $h^{-1}$ at approximately 497° C. using the 1.5:1 $H_2:N_2$ ratio. $H_2:N_2$ ratios with more nitrogen than hydrogen have been tested, but they lead to much lower $NH_3$ synthesis rates.

Figure 2:
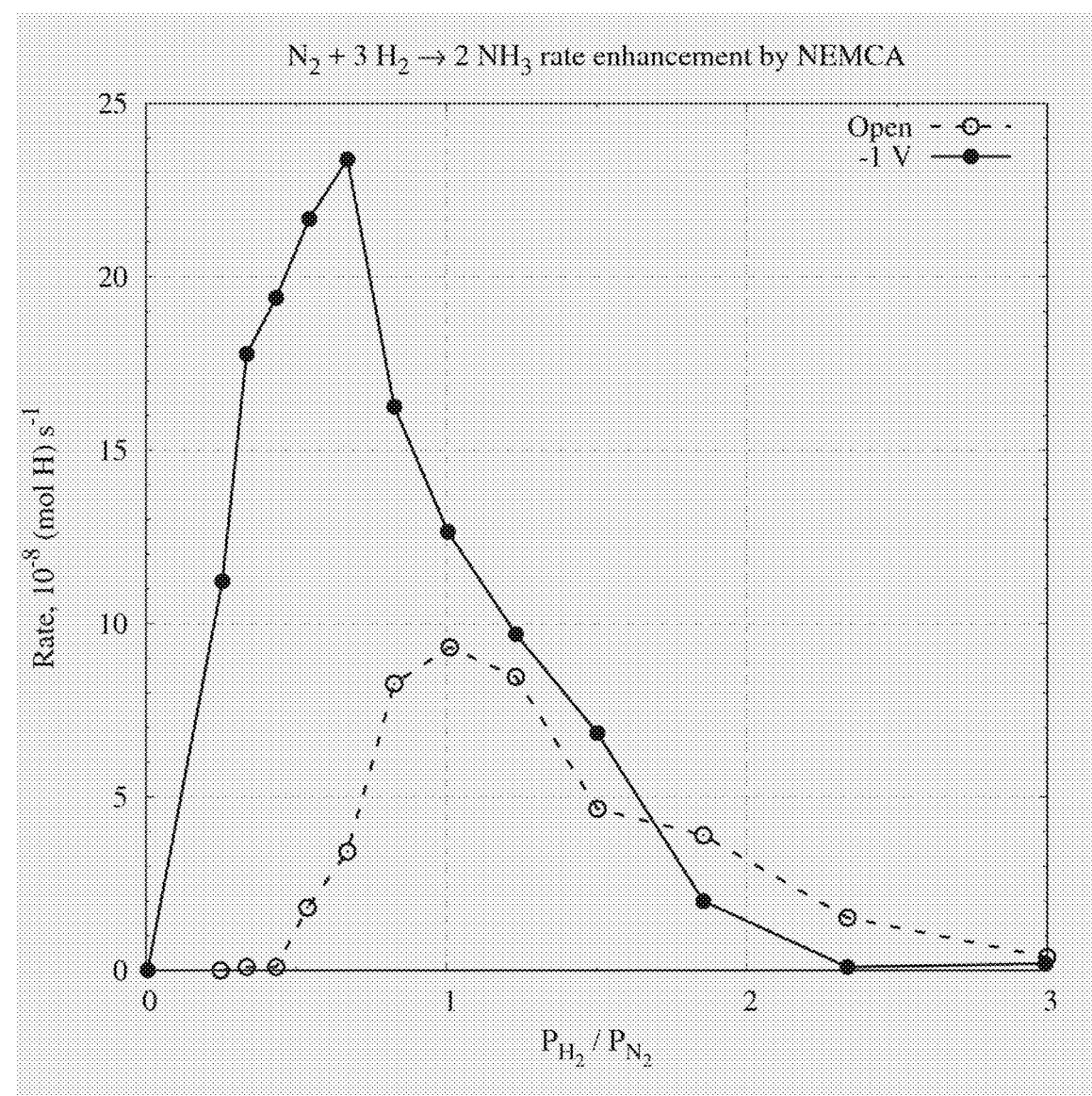
FIG. 2 illustrates the $NH_3$ synthesis rate on commercial iron oxide based catalyst without bias and with −1 V NEMCA bias (from Yiokari)
Figure 3:
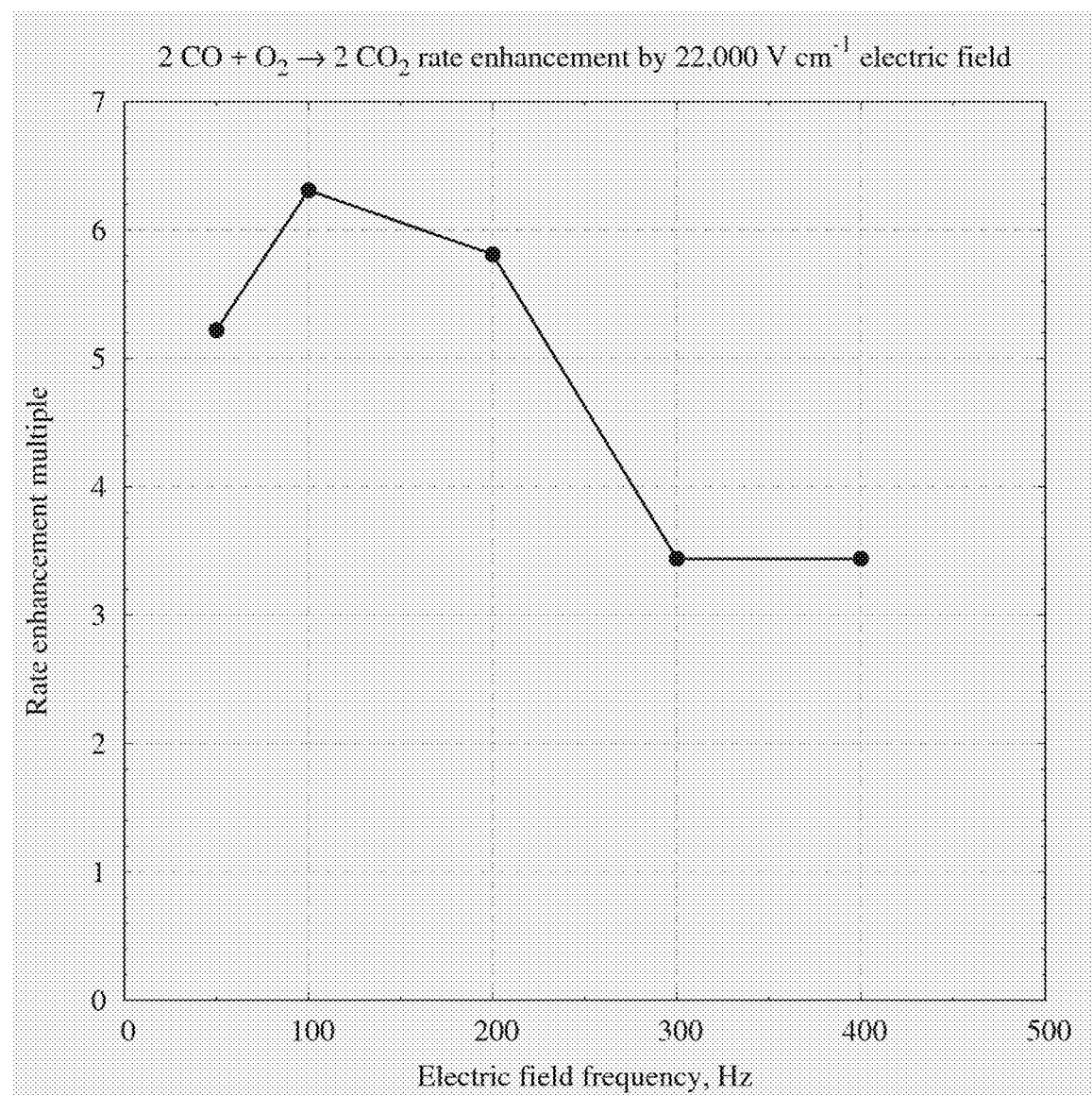
FIG. 3 illustrates the increase in CO oxidation as a function of frequency for a 22,000 V cm$^{-1}$ electric field (data from Lee)
Figure 4:
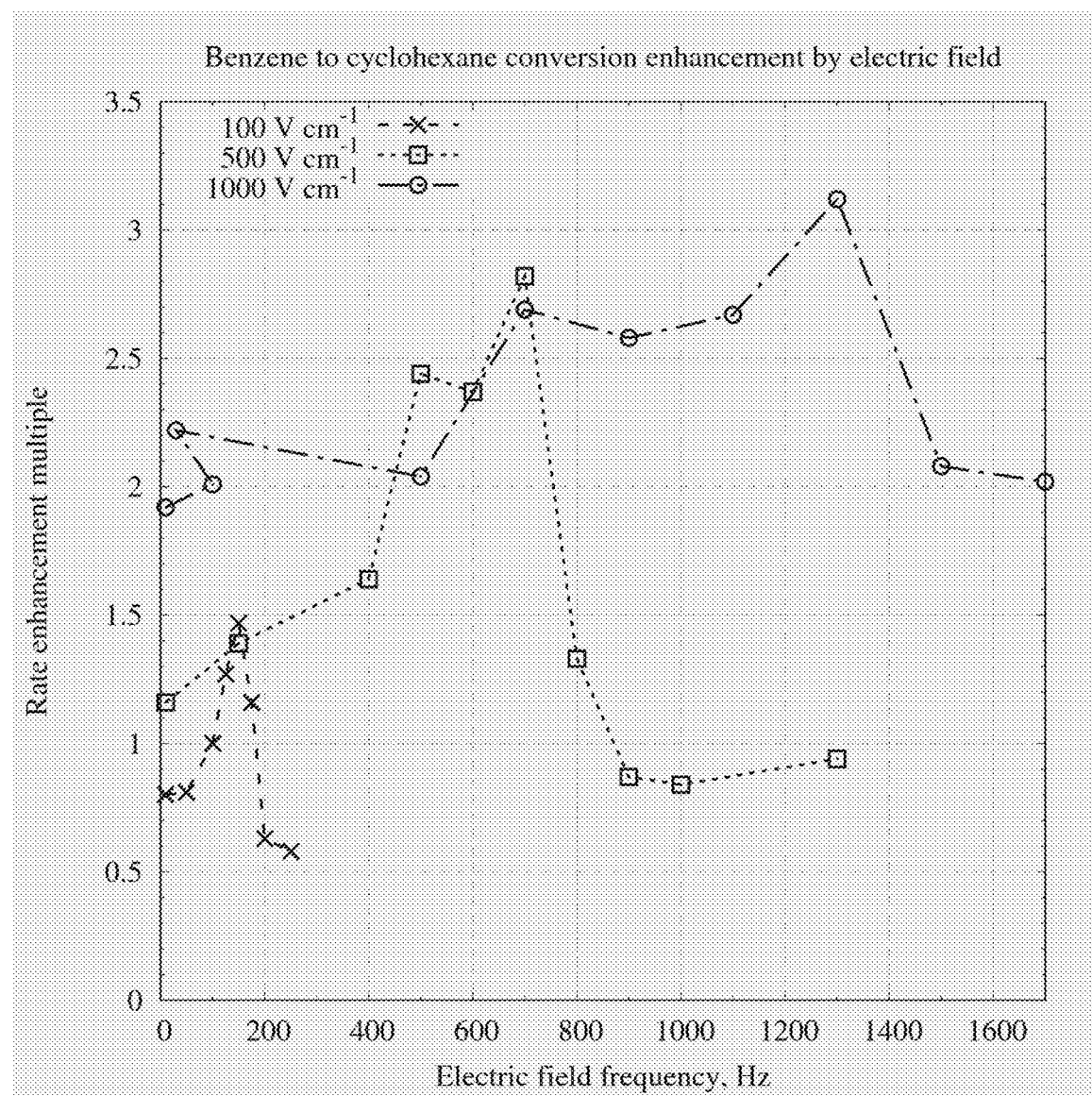
FIG. 4 illustrates the increase in conversion of benzene to cyclohexane for different electric field strengths and frequencies (data from Lee)

Although the data illustrated in FIG. 7 did not use an electrically enhanced Haber-Bosch process, it demonstrations that the test reactor is capable of synthesizing $NH_3$ with a Ru-decorated C12A7:e− electride catalyst. The catalyst's activity with no electrical enhancement peaked at a 1.5:1 to 2:1 $H_2:N_2$ ratio, whereas the promoted iron catalyst used in prior NEMCA-related research (data shown in FIG. 2) peaked at a 1:1 ratio with no NEMCA bias and at a hydrogen lean ratio near 0.7:1 $H_2:N_2$ when it was under −1 V NEMCA bias. The ability to perform well at higher $H_2:N_2$ ratios suggests that this catalyst is less prone to hydrogen poisoning and better able to activate $N_2$ for reaction with $H_2$.

The data in FIG. 7 suggest that examinations of electrical enhancement of $NH_3$ synthesis on Ru-decorated C12A7:e− electride should focus on temperatures ranging from between about 400-500° C. and $H_2:N_2$ ratios containing no less than 1 part hydrogen to nitrogen.

Example 2

The lab-scale differential test reactor described above was used to test the total flow rate dependence of non-electrically enhanced $NH_3$ synthesis on Ru-decorated C3A support. The C3A support was a −45 mesh powder with a surface area of 3.6 $m^2 g^{-1}$ as measured by nitrogen BET analysis. Its surface was decorated with 5 wt. % Ru with 1% dispersion as measured by pulsed CO chemisorption.

The catalyst cup used for the measurement was that illustrated in FIG. 6, but with the electrode assembly removed. The bottom of the cup was fit with a stainless steel screen. A 6 mm layer of ceramic fiber insulation was placed on top of the screen to support the Ru-decorated C3A support powder. The cup was loaded with 5.040 g of catalyst, which created a catalyst bed approximately 1.5 cm deep in the 2.7 cm internal diameter cup.

Figure 8:
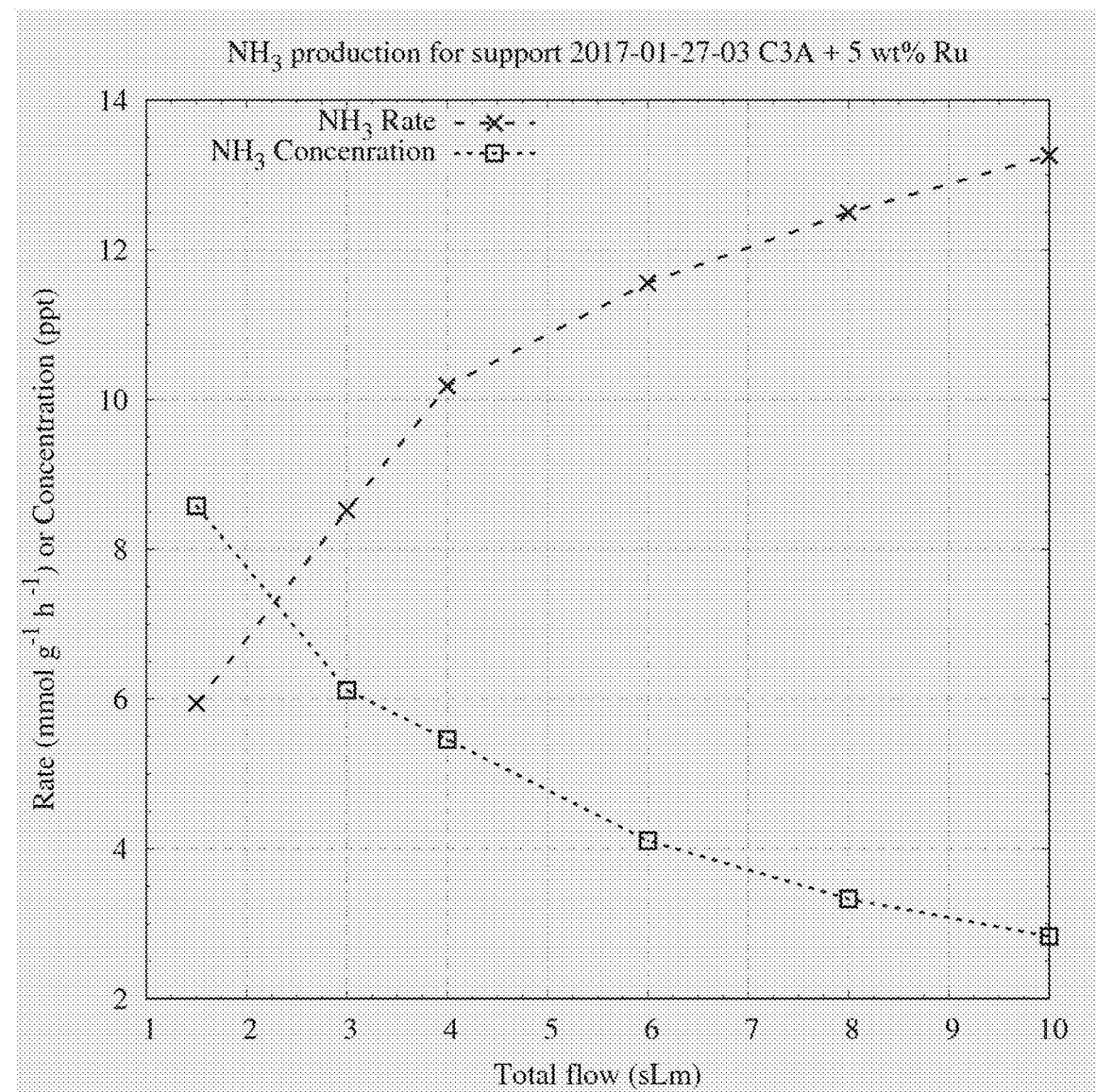
FIG. 8 illustrates stabilized $NH_3$ synthesis rate as a function of total reactor flow rate.

The reactor was run at 470° C., 140 psig total pressure, and a 2:1 $H_2:N_2$ ratio. The stabilized $NH_3$ synthesis rate and product gas $NH_3$ concentration was measured at a series of total gas flows. The data from the measurements is illustrated in FIG. 8. The $NH_3$ synthesis rate increased monotonically with flow rate, and was approximately 13.2 mmol $g^{-1} h^{-1}$ at 10 sLm total flow. The $NH_3$ concentration at that flow was approximately 2.8 ppt, well below the equilibrium value of approximately 5% (50 ppt). This data suggests that the $NH_3$ synthesis rate was being limited by diffusion across a stagnation layer surrounding the catalyst-decorated support particles. Removal of that stagnation layer will require flow rates higher than 10 sLm if the 27 mm internal diameter catalyst cup is used.

The 2.7 cm internal diameter catalyst cup has a linear gas velocity of 29.1 cm/s at 10 sLm. An alternative to increasing the flow rate to increase the linear velocity is to decrease the catalyst cup's cross-sectional area. For example, if the cross sectional area is reduced by a factor of 3 (diameter reduced by a factor of $3^{1/2}$), the gas linear velocity will be increased by a factor of 3 at the same total flow.

When the $NH_3$ synthesis rate is no longer increased by increasing the gas linear velocity, the stagnation layer has been removed from the catalyst-decorated support particles. This provides a minimum gas flow velocity to achieve maximum $NH_3$ synthesis rate in a production reactor. Although the data illustrated in FIG. 8 did not use an electrically enhanced Haber-Bosch process, the approach described above is valid for electrically enhanced processes.

Example 3

$NH_3$ synthesis rates have been measured on Ru-decorated CO-annealed supports where the supports consisted of CA, C5A3, C3A, C12A7, and CaO (calcium oxide, C in cement chemistry notation). Table 2 shows the conditions for each support that have produced the highest $NH_3$ synthesis rates at 4 sLm total flow.

| Support | Area, $m^2 g^{-1}$ | Ru, wt. % | Ru disp., % | H2:N2 | Temperature, ° C. | Rate, mmol $g^{-1} h^{-1}$ |
|---------|---------|-----|------|-------|------|-------|
| C12A7   | 6.2     | 1   | 26   | 1.5:1 | 497  | 9.54  |
| C5A3    | 3.5     | 2   | 2    | 1.5:1 | 495  | 5.82  |
| CA      | 4.0     | 2   | 11   | 1.5:1 | 499  | 4.33  |
| C3A     | 4.4     | 2   | 12   | 1.5:1 | 455  | 11.49 |
| CaO     | 9.1     | 1   | 36   | 1.5:1 | 447  | 11.43 |

Ranges have been discussed and used within the forgoing description. One skilled in the art would understand that any sub-range within the stated range would be suitable, as would any number within the broad range, without deviating from the invention.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

The invention claimed is:

1. A reactor for producing ammonia from nitrogen and hydrogen gas with a supported catalyst, comprising:
a reactor body comprising an elongated tube having a first terminal end and a second terminal end opposite the first terminal end;
an inlet in fluid communication with the first terminal end of the elongated tube for providing the nitrogen and hydrogen gas to the reactor;
an electrical port extending into the elongated tube from the first terminal end;
an interchangeable container positioned at and removably secured to the second terminal end of the elongated tube and in fluid communication with the second terminal end of the elongated tube, wherein the interchangeable container is a separate and distinct structure from the reactor body such that the interchangeable container removably secured to the second terminal end of the elongated tube can be changed;
one or more electrodes disposed within the interchangeable container;
an electride-supported metal-containing catalyst disposed within the interchangeable container; and
an outlet for receiving product gases;
wherein the electride-supported metal-containing catalyst is disposed exclusively within the interchangeable container; and
wherein the electrical port is configured to transmit an electrical current from a power source to one or more electrodes disposed within the interchangeable container.

2. The reactor of claim 1, further comprising a condenser for condensing an ammonia gas in the product gases to ammonia liquid.

3. The reactor of claim 1, wherein the metal of the electride- supported metal-containing catalyst comprises ruthenium.

4. The reactor of claim 1, wherein a support material of the electride-supported metal-containing catalyst is selected from the group consisting of Pentacalcium trialuminate (C5A3), Monocalcium aluminate (CA), Tricalcium aluminate (C3A) and Calcium oxide (CaO).

5. The reactor of claim 1, wherein a weight percent of a catalyst on the electride-supported metal-containing catalyst is between about 0.5 wt. % and about 20 wt. %.

6. The reactor of claim 1, wherein a catalyst dispersion of the electride-supported metal-containing catalyst is between 0.1% and about 90%.

7. The reactor of claim 1, wherein a surface area of the electride-supported metal-containing catalyst is between about 1 and 100 $m^2/g$.

8. The reactor of claim 1, wherein the electrical port provides an electrical current selected from the group consisting of DC, pulsed DC, Nonfaradaic Electrochemical Modification of Catalyst Activity (NEMCA)-mode electrical bias, an electrical field enhancement or AC electrical current.

9. The reactor of claim 1, wherein at least one of the one or more electrodes is an annular electrode disposed within the interchangeable container.

10. The reactor of claim 1, wherein the reactor comprises at least two electrodes disposed within the interchangeable container, and at least two of the at least two electrodes are concentrically aligned annular electrodes disposed within the interchangeable container.

11. The reactor of claim 9, wherein the interchangeable container comprises a first end abutting the second terminal end of the elongated tube of the reactor body and a second end opposite the first end, and the reactor further comprises:
a porous support located proximate the second end of the interchangeable container;
wherein the electride-supported metal-containing catalyst is disposed on the porous support.

12. The reactor of claim 11, wherein the porous support comprises a ceramic fiber, and wherein the porous support is configured to hold the electride-supported metal-containing catalyst in place within the interchangeable container while allowing product gas to pass through the porous support.

13. The reactor of claim 10, wherein the electride supported metal-containing catalyst is located at least between adjacent concentrically aligned annular electrodes.

14. The reactor of claim 9, wherein the electrical port is connected to the at least one annular electrode.

15. The reactor of claim 14, wherein the interchangeable container comprises a cup sidewall, and wherein the electrical port is further connected to the cup sidewall such that the cup sidewall acts as an additional electrode.

16. The reactor of claim 9, wherein the interchangeable container comprises a central axis, and the reactor further comprises:
a central electrode rod aligned with the central axis of the interchangeable container;
wherein the at least one annular electrode is concentrically aligned with the central electrode rod.

17. The reactor of claim 1, wherein the interchangeable container comprises a first end and a second end opposite the first end, and the first end of the container abuts the second terminal end of the elongated tube.

18. The reactor of claim 17, wherein the second end of the interchangeable container is porous.

19. The reactor of claim 1, wherein:
the interchangeable container comprises a flange at a first end of the interchangeable container;
the elongated tube comprises a flange at the second terminal end of the elongated tube; and
the flange at the first end of the interchangeable container is removably secured to the flange at the second terminal end of the elongated to tube to thereby removably secure the interchangeable container to the elongated tube.

20. The reactor of claim 19, wherein the flange at the first end of the interchangeable container is removably secured to the flange at the second terminal end of the elongated tube using bolts or adhesive.

* * * * *